US010963262B2

United States Patent
Kadowaki et al.

(10) Patent No.: US 10,963,262 B2
(45) Date of Patent: Mar. 30, 2021

(54) ESTABLISHING DATA PIPELINES WITH INCLUSION OF ITERATIVE SUB-PIPELINES

(71) Applicant: International Business Machines Corporation, Armonk, NY (US)

(72) Inventors: Isao Kadowaki, Yokohama (JP); Yoshio Horiuchi, Hiratsuka (JP); Masaki Saitoh, Yokohama (JP)

(73) Assignee: International Business Machine Corporation, Armonk, NY (US)

( * ) Notice: Subject to any disclaimer, the term of this patent is extended or adjusted under 35 U.S.C. 154(b) by 106 days.

(21) Appl. No.: 15/975,196

(22) Filed: May 9, 2018

(65) Prior Publication Data

US 2019/0347106 A1 Nov. 14, 2019

(51) Int. Cl.
*G06F 8/36* (2018.01)
*G06F 8/70* (2018.01)
*G06F 9/38* (2018.01)
*G06F 9/54* (2006.01)

(52) U.S. Cl.
CPC ............. *G06F 9/3867* (2013.01); *G06F 8/36* (2013.01); *G06F 8/70* (2013.01); *G06F 9/546* (2013.01); *G06F 2209/5022* (2013.01)

(58) Field of Classification Search
CPC . G06F 9/3867; G06F 8/36; G06F 8/70; G06F 2209/5022; G06F 9/546
See application file for complete search history.

(56) References Cited

U.S. PATENT DOCUMENTS

| 8,036,921 | B2 | 10/2011 | Kumar et al. |
| 9,401,875 | B2 | 7/2016 | Yasuda et al. |
| 9,535,707 | B2* | 1/2017 | Branson .................. G06F 9/44 |
| 10,067,703 | B2* | 9/2018 | Barsness ........... G06F 16/24568 |
| 2013/0198489 | A1* | 8/2013 | Branson .................. G06F 9/44 |
| | | | 712/200 |
| 2013/0227573 | A1 | 8/2013 | Morsi et al. |
| 2015/0121396 | A1 | 4/2015 | Martinez Canedo et al. |
| 2015/0316972 | A1 | 11/2015 | Chen et al. |
| 2017/0063532 | A1 | 3/2017 | Bhattacharyya et al. |
| 2017/0168748 | A1* | 6/2017 | Barsness ........... G06F 16/24568 |

(Continued)

OTHER PUBLICATIONS

Liljana Gavrilovska et al., "Application and Multidisciplinary Aspects of Wireless Sensor Networks," Computer Communications and Networks, Springer, 1 page.

(Continued)

*Primary Examiner* — S. Sough
*Assistant Examiner* — Cheneca Smith
(74) *Attorney, Agent, or Firm* — Patterson + Sheridan, LLP

(57) ABSTRACT

Improved data pipelines are provided. A request to activate a first pipeline based on a first pipeline definition is received. The first pipeline is generated based on the first pipeline definition, wherein generating the first pipeline includes generating a reusable processing module at a first position within the first pipeline, and generating a downstream processing module at a second position within the first pipeline, where the downstream processing module selectively sends output data to the reusable processing module, such that data processed by the first data pipeline will be processed by the identified reusable processing module at least twice. The first pipeline is activated.

20 Claims, 19 Drawing Sheets

(56) References Cited

U.S. PATENT DOCUMENTS

2018/0367460 A1  12/2018  Gao et al.
2019/0196880 A1   6/2019  Horiuchi et al.

OTHER PUBLICATIONS

IBM List of IBM Patents or Patent Applications Treated As Related for U.S. Appl. No. 15/795,196 Establishing Data Pipelines With Inclusion of Interactive Sub-Pipelines as filed on May 9, 2018.

* cited by examiner

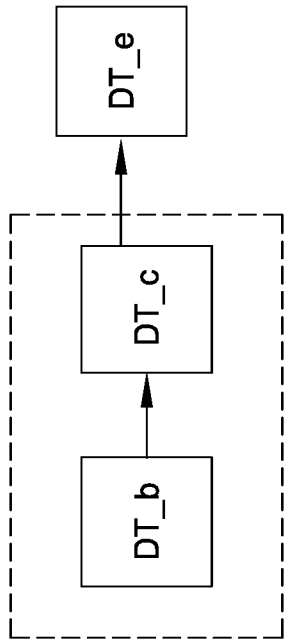
FIG. 5A
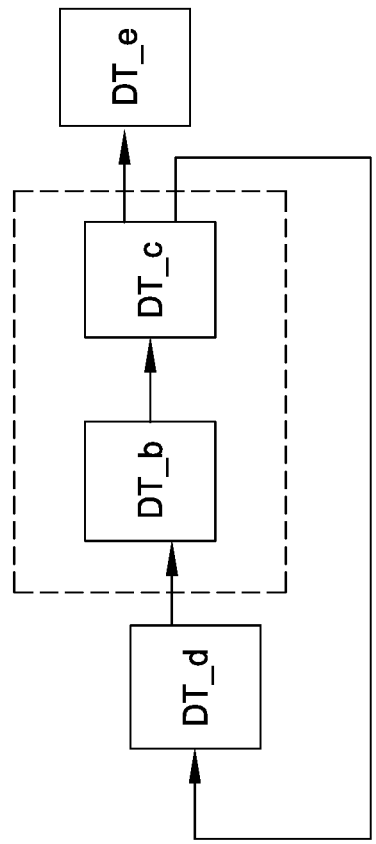
FIG. 5B
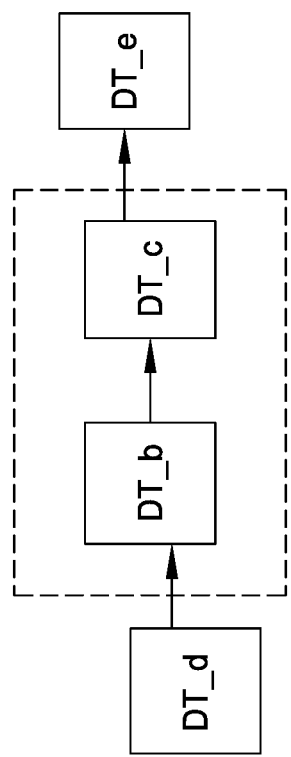
FIG. 5C
FIG. 5D

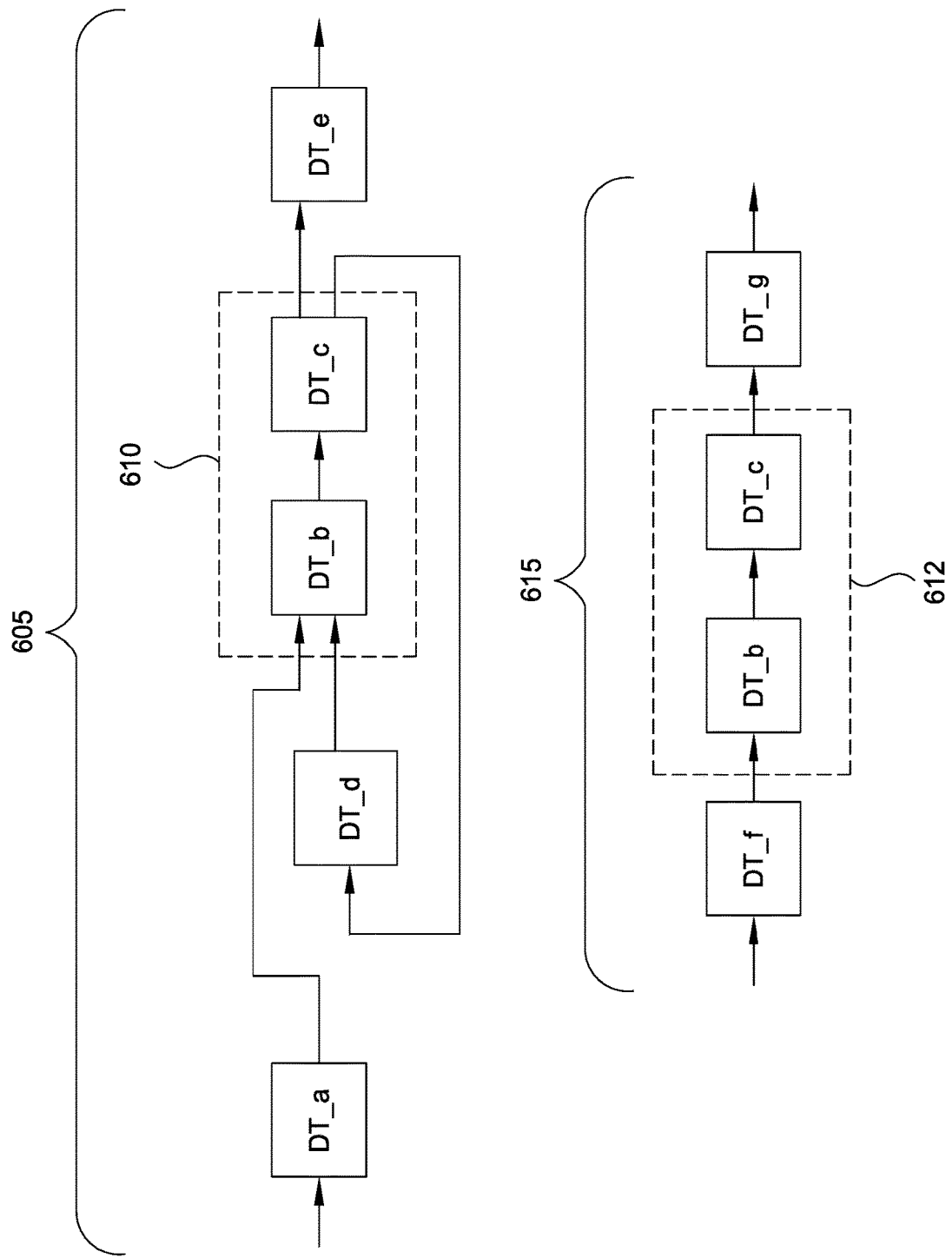

ESTABLISHING DATA PIPELINES WITH INCLUSION OF ITERATIVE SUB-PIPELINES

BACKGROUND

The present disclosure relates to data pipelines, and more specifically, to reusing processor modules in data pipelines.

Data pipelines are used in a wide variety of computing environments, including in extract, transform, and load (ETL) systems. A data pipeline can be used to define a sequential process divided into a number of tasks or operations, each of which can be completed by a separate processing module or data transformer (DT). Typically, data pipelines are defined based on the operations to be performed by each processing module, along with the links or pipes between the modules. When data is to be processed by a data pipeline, it proceeds sequentially through each processing module where it is operated on before continuing through the pipe to the next processing module in a linear manner. In this way, data pipelines are extensible and flexible. However, existing methodologies are often inefficient and wasteful of resources because data flows sequentially and linearly, at times resulting in unnecessary duplication of processing modules.

SUMMARY

According to one embodiment of the present disclosure, a method is provided. The method includes receiving a request to activate a first pipeline based on a first pipeline definition, and generating the first pipeline based on the first pipeline definition. Generating the first pipeline comprises generating a reusable processing module at a first position within the first pipeline, and generating a downstream processing module at a second position within the first pipeline, wherein the downstream processing module selectively sends output data to the reusable processing module, such that data processed by the first data pipeline will be processed by the identified reusable processing module at least twice. Finally, the method includes activating the first pipeline.

According to a second embodiment of the present disclosure, a computer program product is provided. The computer program product includes a computer-readable storage medium having computer-readable program code embodied therewith. The computer-readable program code is executable by one or more computer processors to perform an operation. The operation includes receiving a request to activate a first pipeline based on a first pipeline definition, and generating the first pipeline based on the first pipeline definition. Generating the first pipeline comprises generating a reusable processing module at a first position within the first pipeline, and generating a downstream processing module at a second position within the first pipeline, wherein the downstream processing module selectively sends output data to the reusable processing module, such that data processed by the first data pipeline will be processed by the identified reusable processing module at least twice. Finally, the operation includes activating the first pipeline.

According to a third embodiment of the present disclosure, a system is provided. The system includes one or more computer processors and a memory containing a program which when executed by the one or more computer processors performs an operation. The operation includes receiving a request to activate a first pipeline based on a first pipeline definition, and generating the first pipeline based on the first pipeline definition. Generating the first pipeline comprises generating a reusable processing module at a first position within the first pipeline, and generating a downstream processing module at a second position within the first pipeline, wherein the downstream processing module selectively sends output data to the reusable processing module, such that data processed by the first data pipeline will be processed by the identified reusable processing module at least twice. Finally, the operation includes activating the first pipeline.

BRIEF DESCRIPTION OF THE SEVERAL VIEWS OF THE DRAWINGS

FIGS. 5A through 5D illustrate a process for generating a data pipeline, according to one embodiment disclosed herein.

FIGS. 6A and 6B illustrate pipelines, according to one embodiment disclosed herein.

DETAILED DESCRIPTION

According to embodiments disclosed herein, data transformers (DTs), also referred to as processing modules, can be identified for reuse and data pipelines can be instantiated to take advantage of these reusable DTs. In one embodiment, data pipelines are created and maintained on one or more servers and used by clients to process data. In some embodiments, clients can provide pipeline definitions defining a data pipeline they require. This pipeline definition may include a list of the DTs to be used in the pipeline, as well as the ordering of them (e.g., the links or pipes that connect the DTs). In some embodiments, clients can select from predefined pipeline definitions, rather than define their own. In one embodiment of the present disclosure, these pipeline definitions can be parsed to identify one or more DTs that are included more than once in the pipeline definition. In an embodiment, a DT is included twice (or duplicated) in a pipeline definition if the pipeline definition includes at least two processing modules that perform identical operations on the data. In an embodiment, these duplicate DTs are marked as potentially reusable. In some embodiments, each client defines the DTs in a pipeline definition based on the function(s) or operation(s) to be performed by the each DT. In some embodiments, these functions or operations can be defined by the client, or the client may select from predefined DTs (e.g., DTs with predefined operations or functions).

Figure 1:
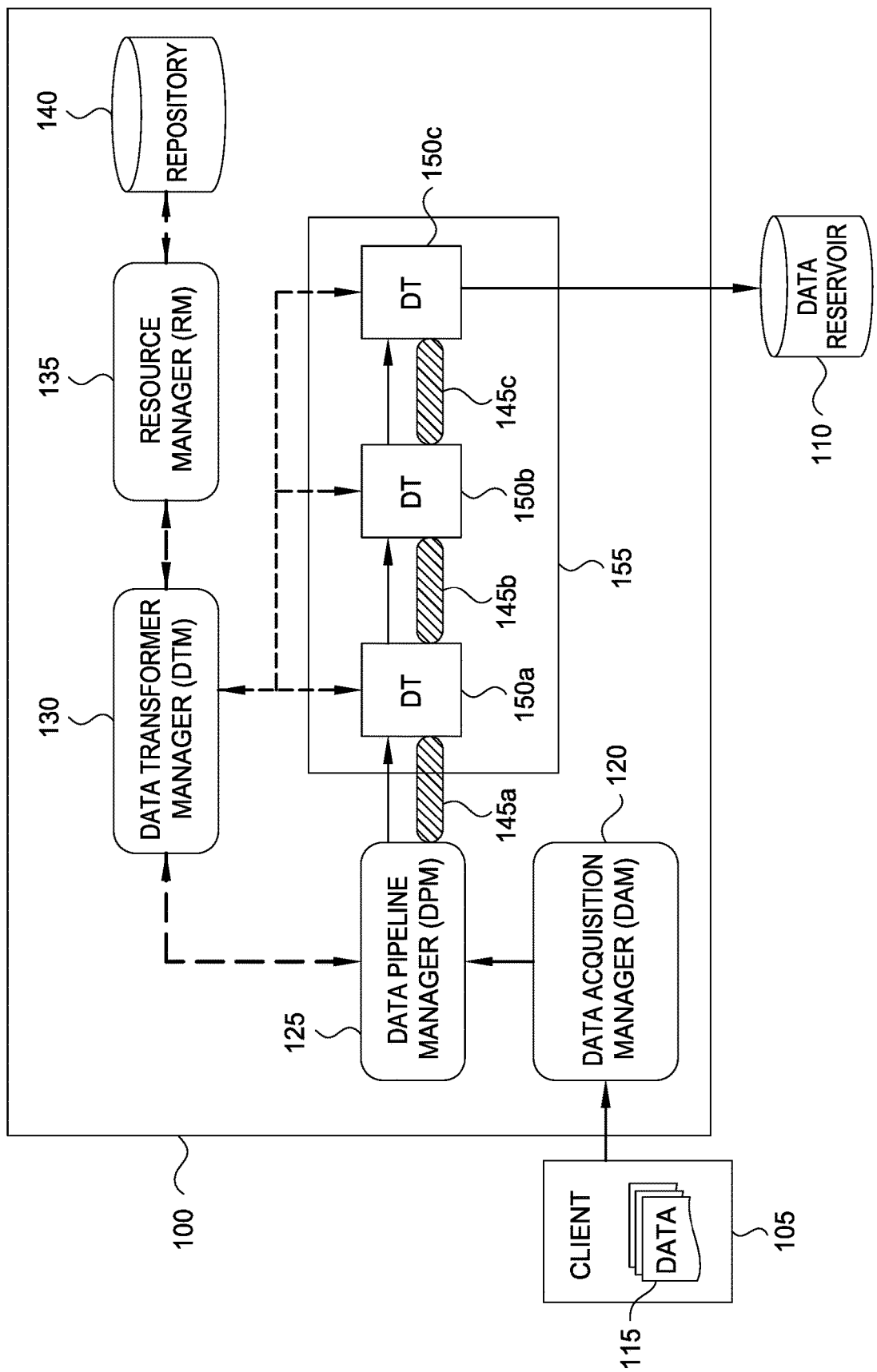
FIG. 1 illustrates a system capable of instantiating data pipelines according to one embodiment disclosed herein.

FIG. 1 illustrates a System 100 capable of instantiating data pipelines according to one embodiment disclosed herein. The system includes a Client Device 105 and a Pipeline System 100. In the illustrated embodiment, the Client 105 provides pipeline definitions to the Pipeline System 100, and these definitions are used to instantiate data pipelines for use by the Client 105. In use, the Client 105 provides Data 115 to the Pipeline System 100, which routes the Data 115 to the appropriate pipeline. The Data 115 is processed by the pipeline, and the resulting output is transmitted to a Data Reservoir 110. In various embodiments, the Data Reservoir 110 may reside on the same system as the Pipeline Server 100, or may be located on one or more other devices. In some embodiments, the Data reservoir 110 is located on a computing device of the Client 105. In some embodiments, the output data is immediately transmitted back to the Client 105, without storage in any Data Reservoir 110. In some embodiments, the Pipeline System 100 operates on one or more servers (e.g., in a cloud environment) and is accessible by any number of clients over a network such as the Internet.

As illustrated, the Pipeline System 100 includes a Data Acquisition Manager (DAM) 120, a Data Pipeline Manager (DPM) 125, a Data Transformation Manager (DTM) 130, a Resource Manager (RM) 135, and a Repository 140. In the illustrated embodiment, solid line arrows generally illustrate the flow of data that is to be processed or has been processed by one or more Data Transformers (DT) 105*a-c*, while dashed line arrows indicate the flow of information such as control code. The DAM 120 generally manages clients who act as input sources of data, as well as providing pipeline definitions. For example, the DAM 120 may manage connections and communications between the Pipeline System 100 and the Client 105 (as well as other clients). In some embodiments, the DAM 120 also transforms the Data 115 received from each Client 105 into a form suitable for processing by one or more data pipelines. For example, in some embodiments, each Client 105 may utilize different protocols or data formats, and the DAM 120 transforms the data for processing. The DAM 120 may then transmit the Data 115 to the DPM 125.

In the illustrated embodiment, the DPM 125 instantiates and configures data pipelines based on user-provided definitions, and passes the received Data 115 to the appropriate pipeline. For example, in some embodiments, the appropriate pipeline may be identified based on the Client 105 who provided the data, or based on metadata associated with the data. Although one Pipeline 155 is illustrated, in embodiments there may be any number of Pipelines 155 existing on the Pipeline System 100. Each Pipeline 155 may reside on a single device or server, or across multiple devices or servers. As illustrated, each data Pipeline 155 comprises one or more DTs 150*a-c*, as well as Data Pipes 145*a-c* to connect the DTs 150*a-c*. In an embodiment, the DPM 125 receives a pipeline definition and creates a Pipeline 155 based on this definition, as will be discussed in more detail below.

In the illustrated embodiment, the DPM 125 is communicatively linked to the DTM 130. In an embodiment, the DTM 130 is responsible for the instantiation and management of the DTs 150*a-c*, based on the instructions provided by the DPM 125. For example, the DPM 125 may parse a pipeline definition to determine that a particular DT 150*a* is required for the pipeline, and request that the DTM 130 instantiate a DT 150*a* for such use. In some embodiments, the pipeline definition can identify one or more processes or operations that are to be completed by each DT 150*a-c*, or may select from predefined DTs 150*a-c*. As illustrated, the DTM 130 is communicatively coupled with each DT 150*a-c* in the System 100, in order to control the DTs 150*a-c* and check the status of each, as needed. Similarly to a Pipeline 155, in one embodiment, each DT 150*a-c* may operate on one or more computing devices.

As illustrated, the RM 135 generally monitor the status of the Pipelines 155, as well as of each DT 150*a-c*. For example, in an embodiment, the RM 135 may maintain the Repository 140. The Repository 140 may store information about each instantiated or activated DT 150, which is processing data in a Pipeline 155. In one embodiment, the Repository 140 also stores load information for each activated DT 150, such as current and historical workloads. In some embodiments, the RM 140 may utilize this load information to predict future workloads as for each DT 150 as well. In an embodiment, the Repository 140 also includes information about whether each DT 150 is shareable, reusable, or both. In some embodiments, a DT 150 is shareable when it can be shared by multiple Pipelines 155. That is, a single activated DT 150 that is shareable may process data belonging to multiple different Pipelines 155, rather than solely data associated with a single Pipeline 155. In some embodiments, the DT 150 may be shareable between Pipelines 155 associated with a single Client 105, or between Pipelines 155 associated with multiple Clients 105. In some embodiments, whether a DT 150 is shareable is defined based on a variety of factors, including the workload of the DT 150 (e.g., whether it is operating near peak workload, or has additional resources available), the processes or operations the DT 150 performs, the Client 105 who instantiated the DT 150 (e.g., based on a contract or agreement with the Client 105), and the like.

In some embodiments, a DT 150 is reusable when it can be reused within a single Pipeline 155. For example, if a particular pipeline definition requires two DTs 150 executing identical operations or processes, a single DT 150 may be instantiated and iteratively reused, rather than generating two distinct DTs 150 (e.g., two instances). This reduces resource usage of the Pipeline System 100. In some embodiments, all shareable DTs 150 are also reusable. In some embodiments, however, a DT 150 may be reusable within a Pipeline 155, but not shareable between Pipelines 155, as defined by the pipeline definition or client agreement. Similarly, in some embodiments, a DT 150 may be shareable but not reusable, based on similar considerations. Additionally, in some embodiments, the concepts of "shareable" and "reusable" are unified such that if a DT 150 is shareable, it is also reusable and if it is reusable, it is also shareable. In some embodiments, the Repository 140 also includes information about how many times each DT 150 is shared (e.g., how many Pipelines 155 use it, or how many times it is reused within one or more Pipelines 155).

In an embodiment, each Pipe 145 is a logical connection between DTs 150 which allows for the sequential processing of data. In embodiments, data may be transmitted between DTs 150 via Pipes 145 utilizing various protocols and methods including TCP/IP, queues such as IBM WebSphere MQ, or any other suitable transmission method. In the illustrated embodiment, once the Pipeline 155 is instantiated and activated, Data 115 is provided by the Client 105 to the DAM 120, which may process the Data 115 in various ways, such as to prepare the Data 115 for execution by the Pipeline 155. The Data 115 is then transmitted to the DPM 125, which may also process the Data 115 in various ways, such as attaching metadata to the Data 115, as will be discussed in more detail below. The data is then transmitted via Pipe 145*a* to DT 150*a* for processing. Once DT 150*a* has completed its processing or transformation of the data, the DT 150*a* transmits the data via Pipe 145*b* to DT 150*b*. DT 150*b* similarly completes transformation or processing of the data, and passes it on to DT 150c via Pipe 145c. Once DT 150c has completed its operations, the data exits the Pipeline 155 to the Data Reservoir 110. Although the illustrated embodiment includes three DTs 150a-c, there may of course be any number of DTs 150 in a given Pipeline 155, according to the needs of the Client 105.

Figure 2:
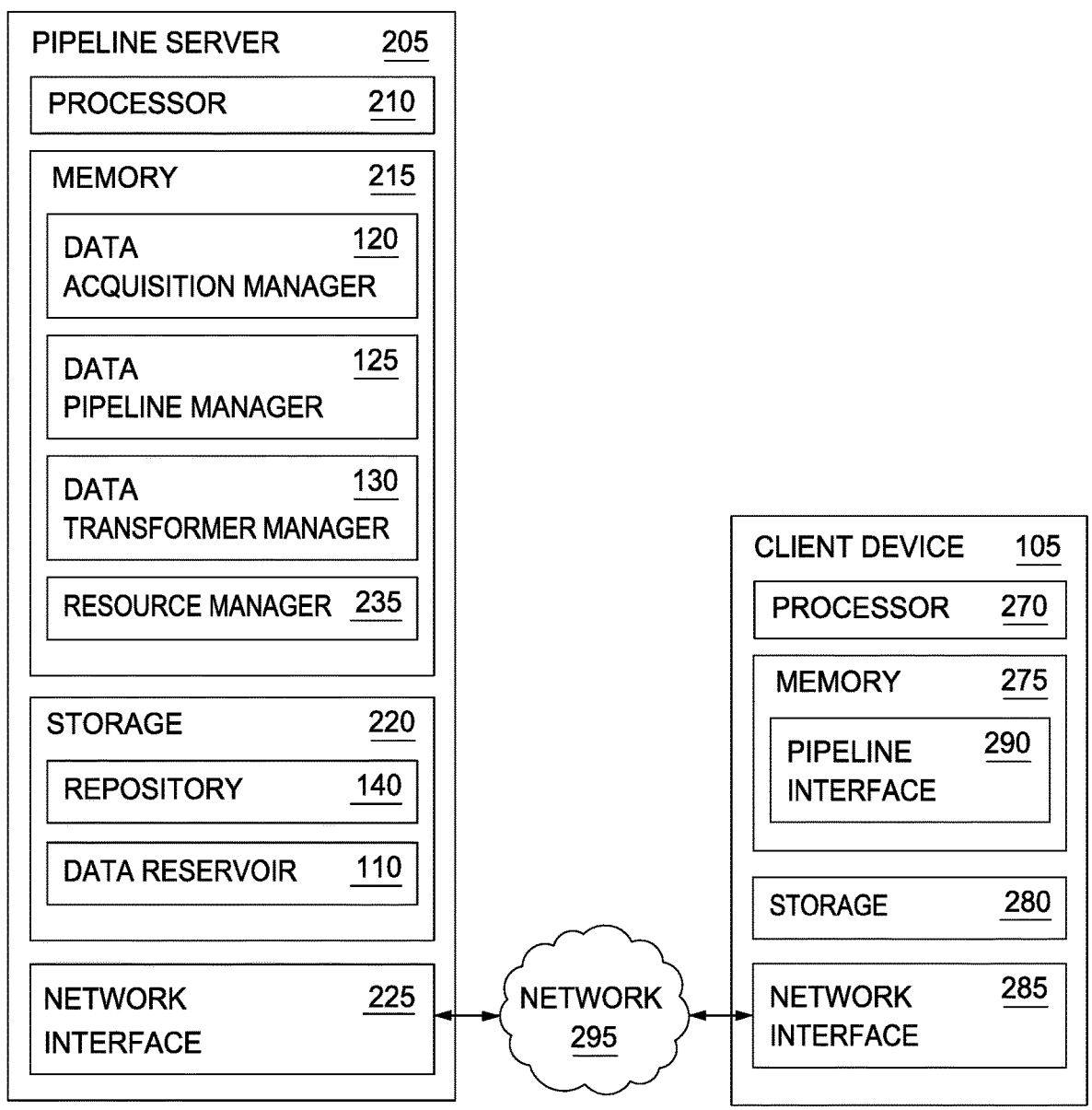
FIG. 2 is a block diagram of a pipeline server configured to implement one embodiment of the present disclosure.

FIG. 2 is a block diagram of a Pipeline Server 205 configured to implement one embodiment of the present disclosure. As illustrated, the Pipeline Server 205 includes a Processor 210, Memory 215, Storage 220, and Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). In the illustrated embodiment, the Pipeline Server 205 may be communicatively coupled with other devices through the Network Interface 225. For example, as illustrated, the Pipeline Server 205 communicates with other devices via a Network 295 (e.g., the Internet).

In the illustrated embodiment, the Memory 215 includes a Data Acquisition Manager 120, Data Pipeline Manager 125, Data Transformation Manager 130, and Resource Manager 135. Although not illustrated, one or more data transformers (e.g., DT 150a-c) may also reside in Memory 215 or in another location. Although illustrated as a single Pipeline Server 205, in some embodiments, each of the components may operate on independent devices, or may be distributed across multiple devices or systems. As illustrated, the Storage 220 includes the Repository 140 for storing information about the currently active data transformers, as well as a Data Reservoir 110 for storage of the output data from each Pipeline 155. In some embodiments, as discussed above, the Data Reservoir 110 may reside on one or more other systems, or the data may simply be transmitted to the appropriate Client 105 upon completion of the processing via the Pipeline 155.

As illustrated, a Client Device 105 includes a Processor 270, Memory 275, Storage 280, and Network Interface 285. In the illustrated embodiment, Processor 270 retrieves and executes programming instructions stored in Memory 275 as well as stores and retrieves application data residing in Storage 280. Processor 270 is representative of a single CPU, multiple CPUs, a single CPU having multiple processing cores, and the like. Memory 275 is generally included to be representative of a random access memory. Storage 280 may be a disk drive or flash-based storage device, and may include fixed and/or removable storage devices, such as fixed disk drives, removable memory cards, or optical storage, network attached storage (NAS), or storage area-network (SAN). In the illustrated embodiment, the Client Device 265 may be communicatively coupled with other devices through the Network Interface 285. For example, as illustrated, the Client Device 265 communicates with other devices (e.g., Pipeline Server 205) via a Network 295 (e.g., the Internet). In the illustrated embodiment, the Memory 275 of the Client Device 265 includes a Pipeline Interface 290. In an embodiment, the client can use the Pipeline Interface 290 to transmit pipeline definitions to the Pipeline Server 205, as well as to transmit data to be processed and to receive data which has been processed.

Figure 3:
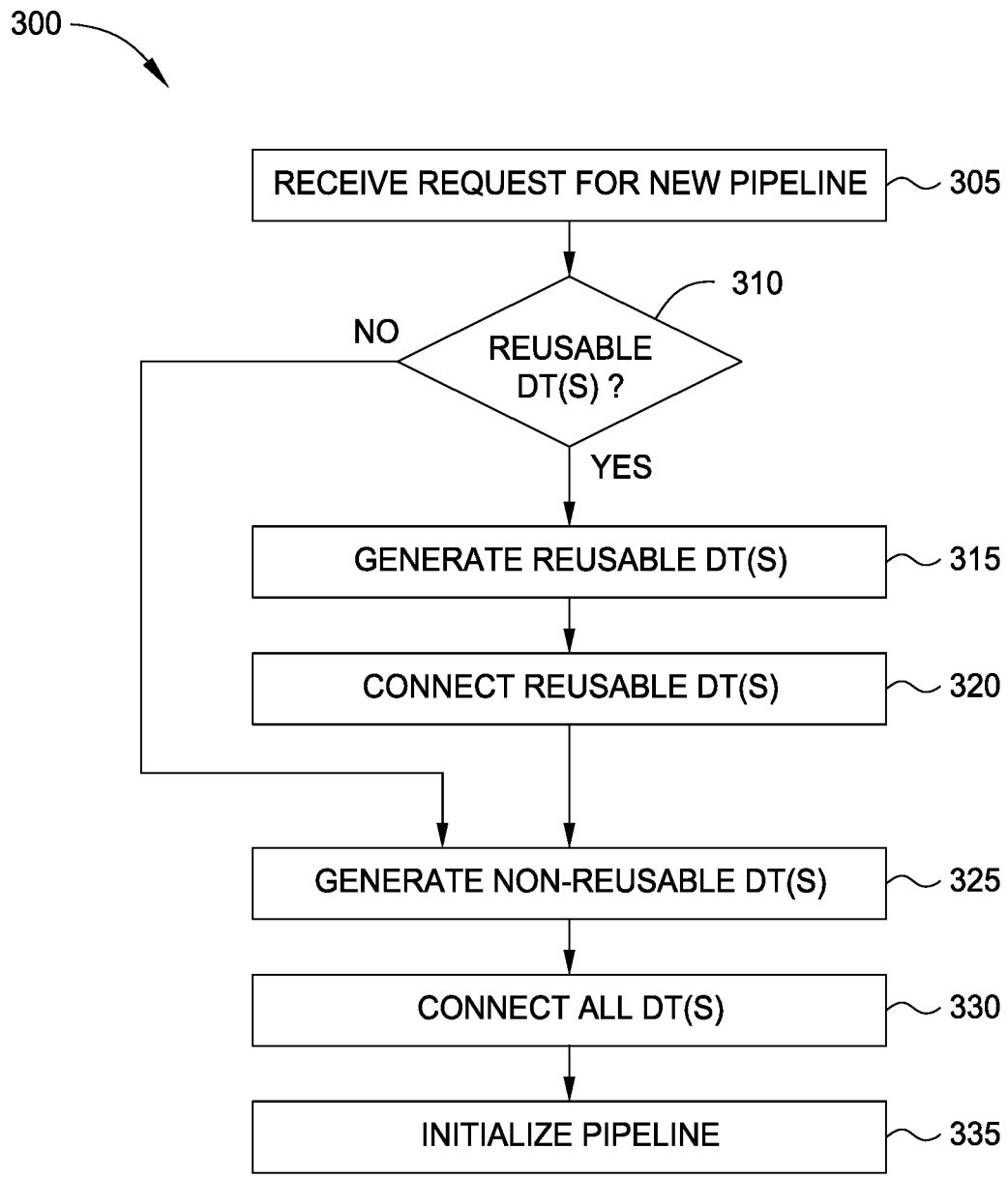
FIG. 3 is a flow diagram illustrating a method of activating data pipelines, according to one embodiment disclosed herein.

FIG. 3 is a flow diagram illustrating a method 300 of activating data pipelines, according to one embodiment disclosed herein. As discussed above, embodiments of the present disclosure enable the identification of data transformers (DTs) which appear more than once in a data pipeline. For example, a pipeline definition may include two or more DTs that perform the same operations or processes on the data. In embodiments disclosed herein, these identified DTs may be implemented as a single DT (or a series of DTs) that are iteratively reused as needed. In effect, a sub-pipeline is created to route data through repeatedly, based on the pipeline definition. At block 305, the Pipeline System 100 receives a request for a new pipeline to be instantiated. For example, the Pipeline System 100 may receive a pipeline definition that comprises a list of DTs 150, as well as the logical links (e.g., Pipes 145) between them. In some embodiments, the pipeline definition may comprise an ordered list of DTs 150 without any explicitly defined Pipes 145. In such an embodiment, there may be an inferred Pipe 145 between each DT 150, and data is to be processed based on the order they are listed.

The method 300 proceeds to block 310, where the Pipeline System 100 determines whether the pipeline definition includes any reusable DTs. In one embodiment, this determination is based on whether there are any DTs that are present twice in the pipeline definition. In some embodiments, this determination may be further based on estimating the load of each potentially reusable DT, and determining whether a single DT instance could satisfy this workload or if two or more will be required (such that they cannot be reused). The estimated workload may be based on data provided by the Client 105, based on historical workload data for that type of DT or pipeline, historical data associated with the particular Client 105, and the like. In some embodiments, determining whether there are reusable DTs is further based on determining whether there are any activated or instantiated DTs in the Pipeline System 100 that can fill the role of one or more of the DTs in the pipeline definition, as will be discussed in more detail below.

If no reusable DTs exist in the pipeline definition, the method 300 proceeds to block 325, which is discussed in detail below. If at least one DT in the pipeline definition can be reused, the method 300 proceeds to block 315, where the Pipeline System 100 (e.g., the DTM 130), generates the identified reusable DTs. In some embodiments, as will be discussed in more detail below, this generation step may be replaced with a step to identify already instantiated or activated DTs which can be used. At block 320, the reusable DTs are connected. That is, the logical links defined in the pipeline definition that connect the reusable DTs, if any, are created. The method 300 then proceeds to block 325, where the DTM 130 generates the non-reusable DTs defined in the pipeline definition. At block 330, the DTM 130 connects the reusable and non-reusable DTs, as defined in the pipeline definition. In some embodiments, the DTs are connected in order from the most downstream node backwards towards the DPM 125, as will be discussed in more detail below. Finally, once all of the logical connections have been established, the pipeline is initialized and activated for use.

Figure 4A:
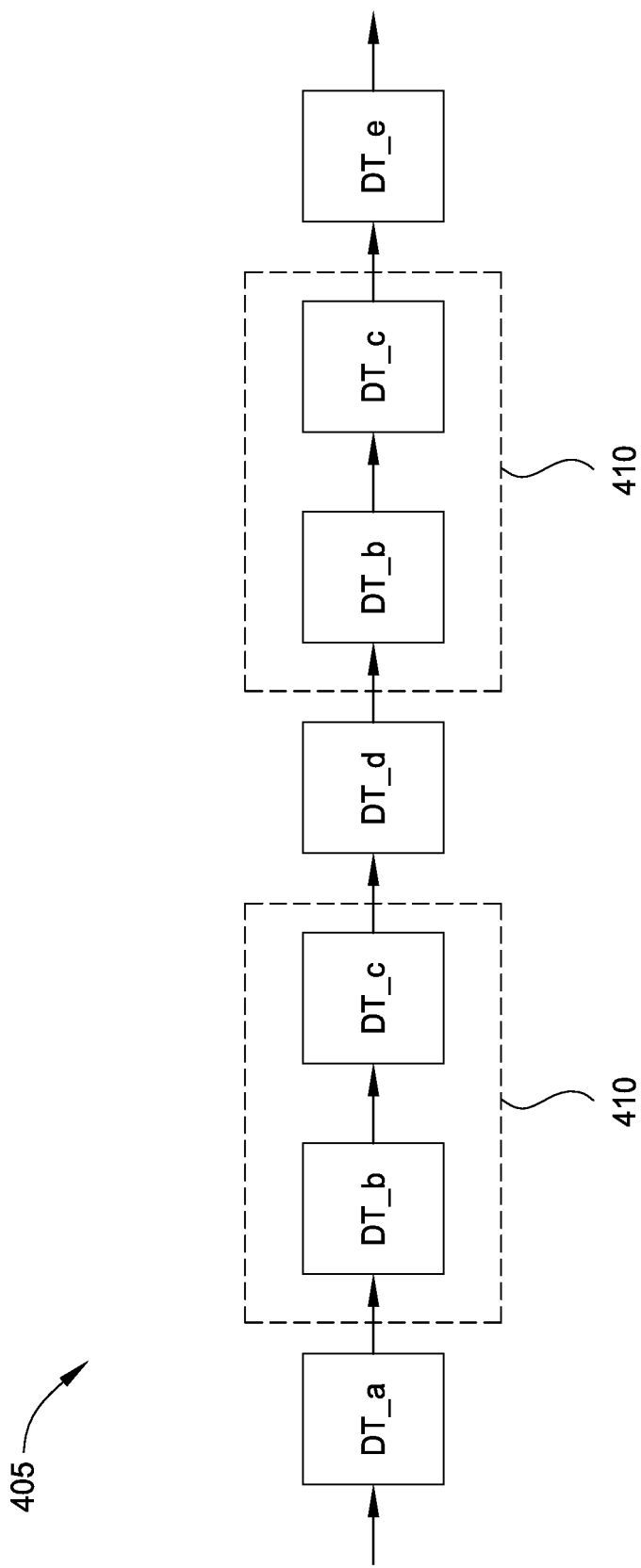
FIGS. 4A and 4B illustrate pipelines, according to one embodiment disclosed herein.

FIG. 4A illustrates a Pipeline Definition 405, according to one embodiment disclosed herein. The illustrated Pipeline Definition 405 includes a number of DTs, labeled DT_a, DT_b, DT_c, DT_d, and DT_e. As illustrated, two DTs (DT_b and DT_c) are used twice in the pipeline, as highlighted by the blocks 410. That is, the first and second instances of DT_b are identical and perform the same operations, and the first and second copies of DT_c are identical and perform the same operations. In the illustrated Pipeline Definition 405, the Client 105 has defined a pipeline where data initially flows to DT_a for processing, then to DT_b, then to DT_c, and on to DT_d. From there, the data flows to DT_b, then to DT_c, and finally to DT_e. After being processed or transformed by DT_e, the data exits the pipeline. Although the illustrated embodiment is a graphical depiction of the Pipeline Definition 405, in various embodiments the Pipeline Definition 405 may comprise a list of DTs defined based on the operations each is to perform, or based on a DT identifier.

Figure 4B:
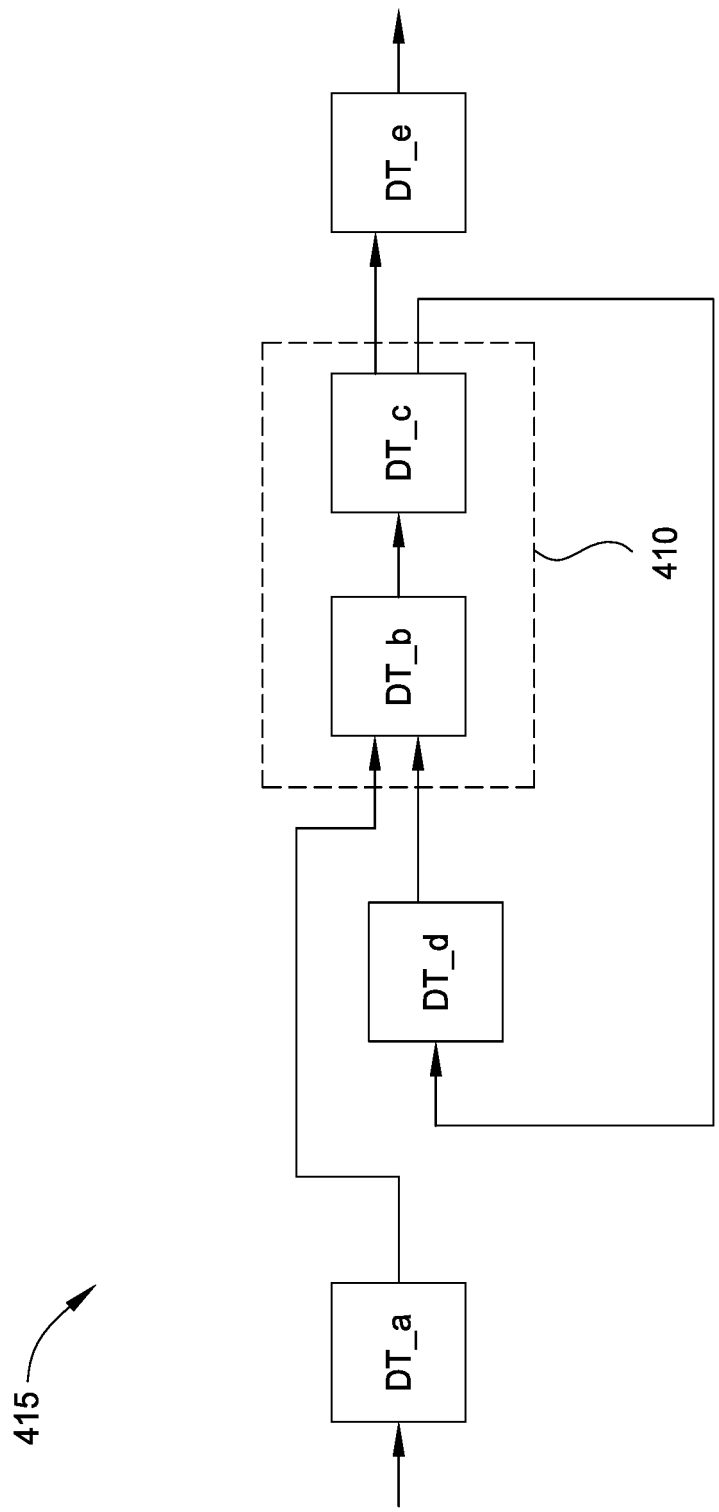

FIG. 4B illustrates a Pipeline Instantiation Diagram 415, according to one embodiment disclosed herein. The illustrated Pipeline Instantiation Diagram 415 corresponds to the Pipeline Definition 405 illustrated in FIG. 4A. As discussed above, the DPM 125 identified DT_b and DT_c (highlighted by box 410) as potentially reusable DTs. In some embodiments, this may be based on the fact that the DTs are used twice in the definition (i.e., that two or more processing modules performing the same operation(s) are included in the definition). In some embodiments, this determination may further be based on the predicted workload of each, as well as any agreements or indications provided by the client. In the illustrated embodiment, rather than instantiate the pipeline with two copies (two instances) of DT_b and DT_c, the DPM 125 has determined to use the DT_b to DT_c portion as a sub-pipeline that is reused within the pipeline. That is, a logical link can be created linking DT_c to DT_d, along with a logical link connecting DT_d to DT_b, which avoids the creation of two distinct instances of each. Thus, in the illustrated embodiment, DT_b and DT_c are at a first position in the data pipeline, and data flows from DT_a to DT_b, and on to DT_c. The first time a particular piece of data (e.g., a data packet or other unit of data used by the pipeline), it is transmitted from DT_c to DT_d. From there, it continues back to DT_b and DT_c. This second pass, the data is forward on to DT_e, rather than looping back to DT_d. In an embodiment, this routing is achieved via a metadata queue, as will be discussed in more detail below. In this way, although DT_d is in a position that is downstream of DT_b and DT_c (because the data received by DT_d has already been processed by DT_b and DT_c), data is still selectively transmitted back to DT_b to be processed again.

In the illustrated embodiment, DT_b and DT_c are used twice within the pipeline. In embodiments, however, a reusable DT may be reused any number of times. In some embodiments, the number of times a DT may be reused may be limited by a predefined value (e.g., as indicated or agreed upon with the client), or limited by the processing capabilities and workload capacity of the DT.

FIGS. 5A through 5D illustrate a process for generating a data pipeline, according to one embodiment disclosed herein. As discussed above, in some embodiments, each data pipeline is instantiated beginning with the furthest downstream DT, progressing upstream towards the DPM 125. In FIG. 5A, the DTs that are to be reused are first instantiated and connected, as defined in the data pipeline. In FIG. 5B, the downstream DT_e is generated and connected to DT_c, as indicated by the pipeline definition. In some embodiments, DT_e is created first, followed by DT_c and DT_b. In FIG. 5C, the next upstream DT (DT_d) is generated and connected to DT_b. In the Pipeline Definition 405, the next upstream DT is DT_c. As illustrated in FIG. 5D, rather than create a new DT_c, a logical connection is created between DT_d and the existing DT_c. Finally, the most upstream operator (DT_a) is created and added to the pipeline, as illustrated in FIG. 4B. That is, because the next upstream operator (DT_b) has already been instantiated and the pipe has already been created, the process can proceed directly to the DT that is immediately upstream of the reused DTs during the first pass.

In some embodiments, pipelines are initiated from the most downstream node backwards to the most upstream node to ensure that no data can be lost. For example, if the most upstream DT is created and linked first, any data sent to it (accidental or otherwise) may be lost if the rest of the pipeline has not been created to receive the data. If the link connecting the most upstream DT to the DPM 125 is created only after all other DTs have been instantiated, however, no data can be lost. In this way, proceeding from the last DT backwards to the first DT in the pipeline ensures data integrity. In some embodiments, when deactivating a pipeline, the process similarly begins by deactivating the first DT and progressing through to the last DT, to ensure that no data is lost by removal of a downstream DT.

In some embodiments, a reusable DT may be converted to a non-reused DT under various conditions. For example, if the workload exceeds or approaches a threshold amount (e.g., an amount of traffic that risks causing the DT to fail or slow unacceptably), the Pipeline System 100 may instantiate a second DT, and reconfigure the pipeline to use the new DT as well, rather than routing data back through the identified DT repeatedly. Similarly, if the workload at duplicate DTs decreases such that a single DT could handle the entire workload, the Pipeline System 100 may reconfigure the pipeline by repeatedly routing data through one of the duplicate DTs, and deactivating the other.

FIG. 6A illustrates a Pipeline Definition 615 and an activated Pipeline 605, according to one embodiment disclosed herein. In the illustrated embodiment, the Pipeline 605 has been instantiated and activated in the Pipeline System 100, while the Pipeline Definition 615 has just been received by the Pipeline System 100. In the illustrated embodiment, even though no DTs are reused within the Pipeline Definition 615, the DPM 125 has identified the block 612 (including DT_b and DT_c) as potentially reusable or shareable. This may be because, for example, the client has indicated that these particular DTs are reusable or shareable, or because of an agreement with the client. The DPM further identified DT_b and DT_c (highlighted by block 610) in the activated Pipeline 605 as a set of DTs that can serve the same function as the block 612 in the Pipeline Definition 615. In one embodiment, to identify the block 612, the DPM 125 may parse the Pipeline Definition 615 to identify any DTs that are potentially reusable or shareable, and notify the RM 135 of these identified DTs. The RM 135 may then search the Repository 140 to determine whether any of the identified DTs have already been instantiated and activated in the Pipeline System 100. If so, the RM 135 can determine whether these active DTs are reusable or shareable, based on the configuration associated with the DTs, as well as the current and predicted workload of each DT.

In some embodiments, the RM 135 may also determine whether to share or reuse an already-activated DT based in part on the expected life of the activated DT. For example, if the activated DT is expected to be deactivated, the RM 135 may select a different DT or may direct the instantiation of a new DT, rather than reuse the identified DT. Thus, in the illustrated embodiment, the Pipeline System 100 has determined that the DTs indicated by block 610 are reusable and shareable. That is, even though they are already used twice by the Pipeline 605, they have sufficient workload availability to take no the expected load of the Pipeline Definition 615 and replace the DTs indicated by block 612. Advantageously, this reduces the resources required by eliminating the creation of duplicative DTs.

Figure 6B:
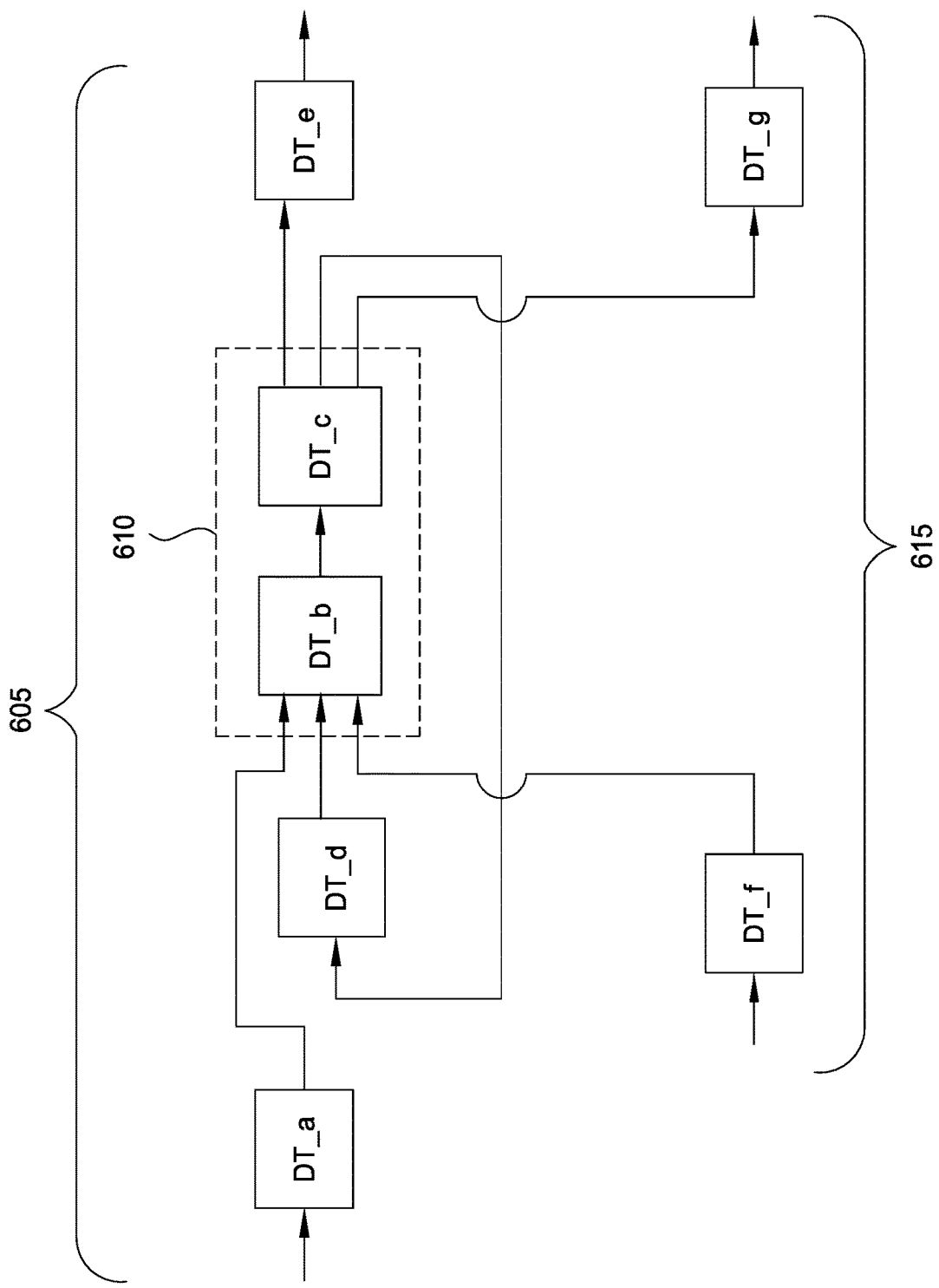

FIG. 6B illustrates activated Pipelines 605 and 615, according to one embodiment disclosed herein. As discussed above, the Pipeline System 100 determines that DT_c and DT_b in Pipeline 605 can be shared with Pipeline 615, in order to reduce duplication in the system. Therefore, when instantiating the Pipeline 615, after generation of DT_g and DT_f, the Pipeline System 100 created a link connecting DT_c to DT_g, as well as a link connecting DT_f to DT_b. In this way, DT_b and DT_c are shared by the pipelines, as well as reused within Pipeline 605. In one embodiment, to ensure that the data remains within its respective pipelines even when one or more DTs are shared across pipelines, the DPM 125 may associate each piece of incoming data with a metadata tag indicating the Pipeline 605 or 615 to which it belongs. Thus, when data with metadata indicating it should be processed by Pipeline 615 is received by DT_c, it can be forwarded to DT_g based on this tag, rather than to a DT belonging to Pipeline 605.

Figure 7:
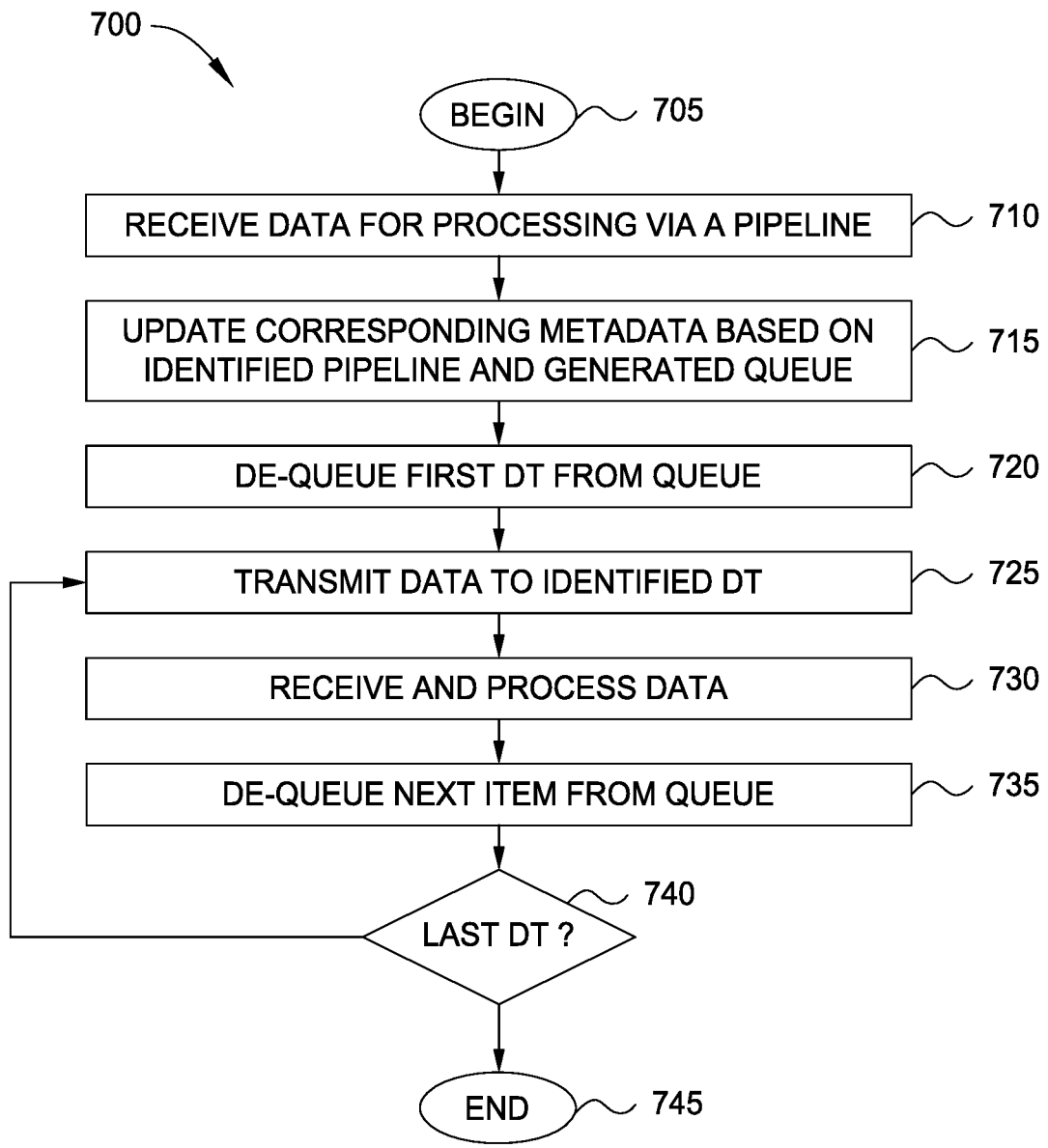
FIG. 7 is a flow diagram illustrating a method of processing data with a data pipeline, according to one embodiment disclosed herein.

FIG. 7 is a flow diagram illustrating a method 700 of processing data with a data pipeline, according to one embodiment disclosed herein. The method begins at block 705. At block 710, the DPM 125 receives data to be processed via a pipeline in the Pipeline System 100. At block 715, the DPM 125 associates the data with metadata based on the pipeline with which the data is to be processed, as well as a queue indicating the order of DTs that are to be used. For example, based on the DTs listed in the pipeline definition, the DPM 125 may generate a queue or other first-in-first-out (FIFO) data structure beginning with the first DT and finishing with the most downstream DT. In this way, the data element at the top or first position of the queue indicates the DT to which the data should be sent next. This queue is associated with the metadata of the piece of data. At block 720, the DPM 125 de-queues the first data element (sometimes referred to as popping the queue), which identifies the first DT in the data pipeline to which the data should be transmitted (i.e., with a unique identifier). The method 700 then proceeds to block 725, where the DPM transmits the data to the identified DT. In some embodiments, identifying the destination DT is also based on the data pipeline identification value, which may also be included in the metadata of the data to be processed.

In some embodiments, the queue includes DT identifiers that uniquely identify each DT in the Pipeline System 100. That is, in an embodiment, even if two DTs that complete identical operations or processes, they may have unique identifiers to distinguish them. In one embodiment, even if two DTs in a single pipeline perform identical operations, they may nevertheless have distinct identifiers to ensure that data intended for one is not routed to the other. In some embodiments, this DT identifier may include an address of the DT (e.g., a network address, an address in memory, or some other address used to locate the DT). In such an embodiment, each DT can transmit the data to the appropriate DT based on this unique identifier, which ensures that the data is not misrouted or erroneously transmitted to an incorrect DT. In some embodiments, in addition to including a unique DT identifier, each entry in the queue may also include an indication as to which pipeline the DT is assigned, or which pipeline the data is to be processed with.

At block 730, this DT receives the data and processes or transforms the data based on the configuration of the DT. At block 735, the DT pops the next DT from the queue in the data's metadata, in order to identify the next DT in the pipeline. In some embodiments, this operation is performed by a framework operating on the DT, so that the DT itself need not complete this process. At block 740, it is determined whether the current DT is the last DT in the pipeline. That is, it is determined if popping the queue generated an identified next DT or not. If so, the method 700 returns to block 725, where the data is transmitted to the identified DT. As discussed above, the appropriate DT may also be selected based on the desired pipeline, as indicated by the metadata. In this way, the data remains within the appropriate pipeline, and also prevents erroneous loops or iterations within the pipeline, as will be discussed in more detail below. If the current DT is the final processing module in the pipeline, however, the method 700 terminates at 745. This may comprise, for example, transmitting the data to the Data Reservoir 110, to the client, and the like.

Figure 8A:
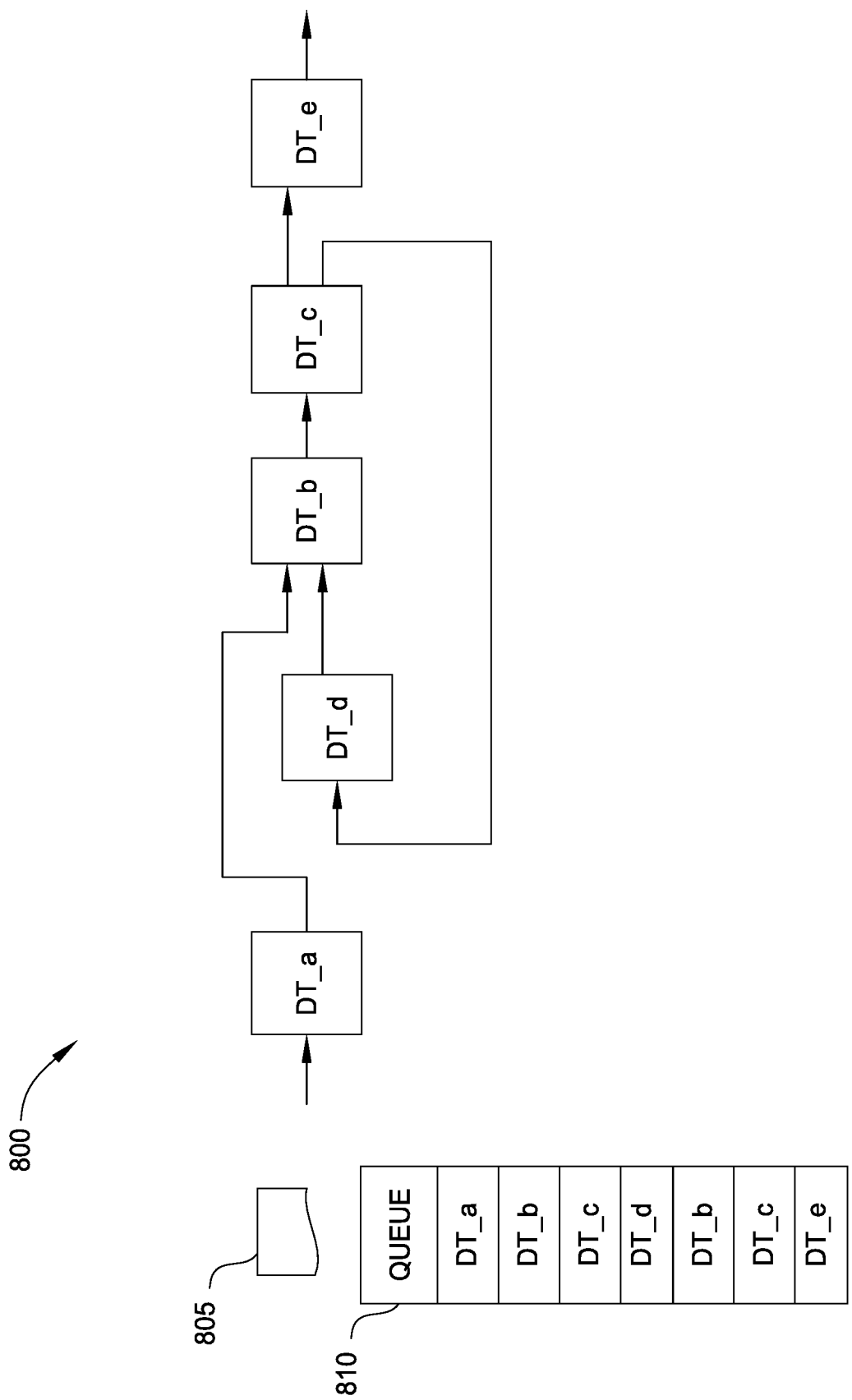
FIGS. 8A through 8I illustrate processing data using a data pipeline, according to one embodiment disclosed herein.

FIGS. 8A through 8I illustrate a method of processing data using a data Pipeline 800, according to one embodiment disclosed herein. In FIG. 8A, the DPM 125 has generated a Queue 810 and associated it with a piece of Data 805 that is to be processed by the Pipeline 800. In the illustrated embodiment, the Pipeline 800 was instantiated based on Pipeline Definition 405. That is, as defined in the Pipeline Definition 405, data should flow to DT_a, then to DT_b, then to DT_c, then to DT_d, then to DT_b, then to DT_c, then to DT_e, then exit the Pipeline 800. Thus, as illustrated, the DPM 125 has created a Queue 810 that follows this ordering. In an embodiment, the Queue 810 is included or referenced by the metadata associated with the Data 805.

Figure 8B:
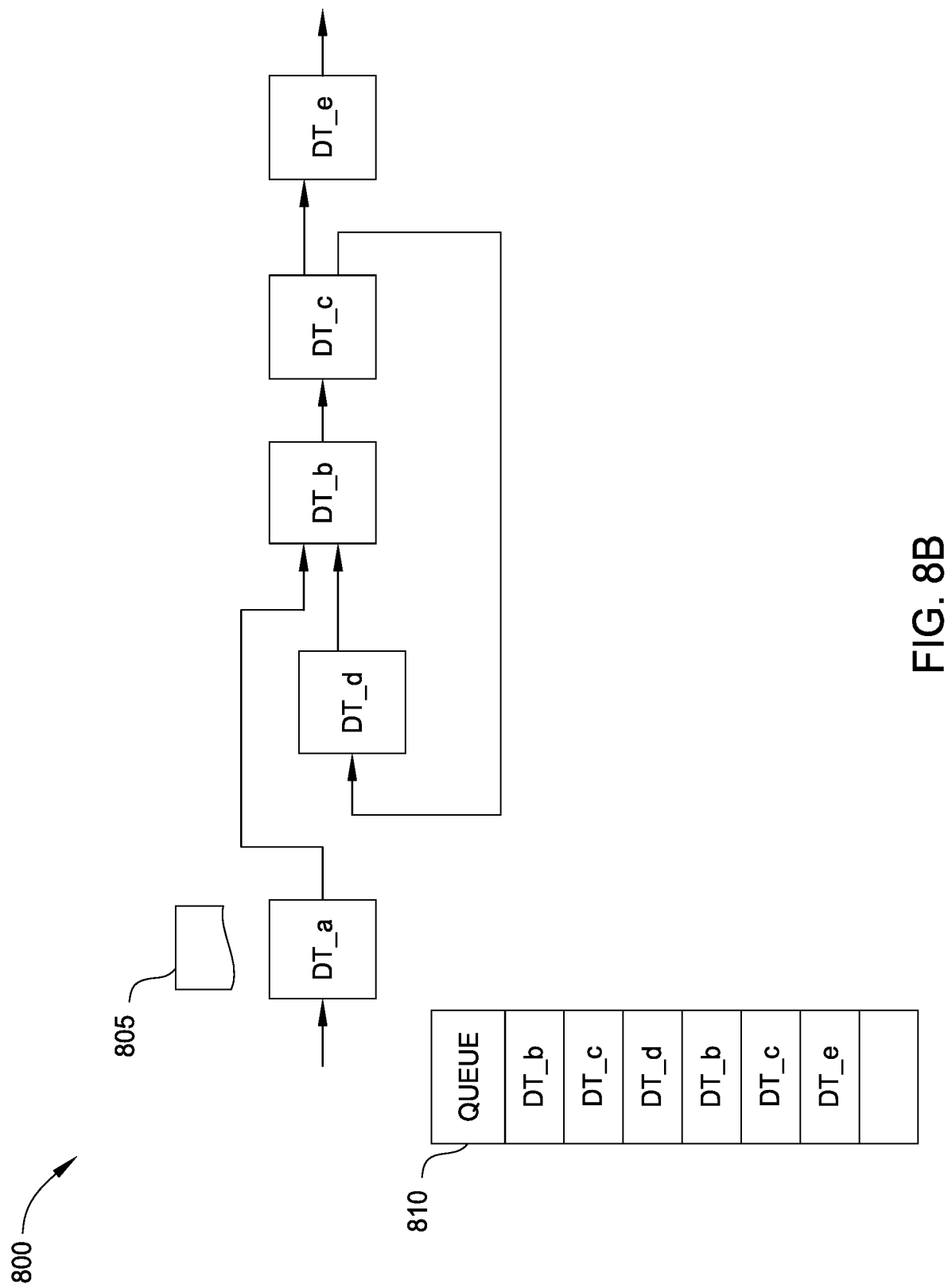
Figure 8C:
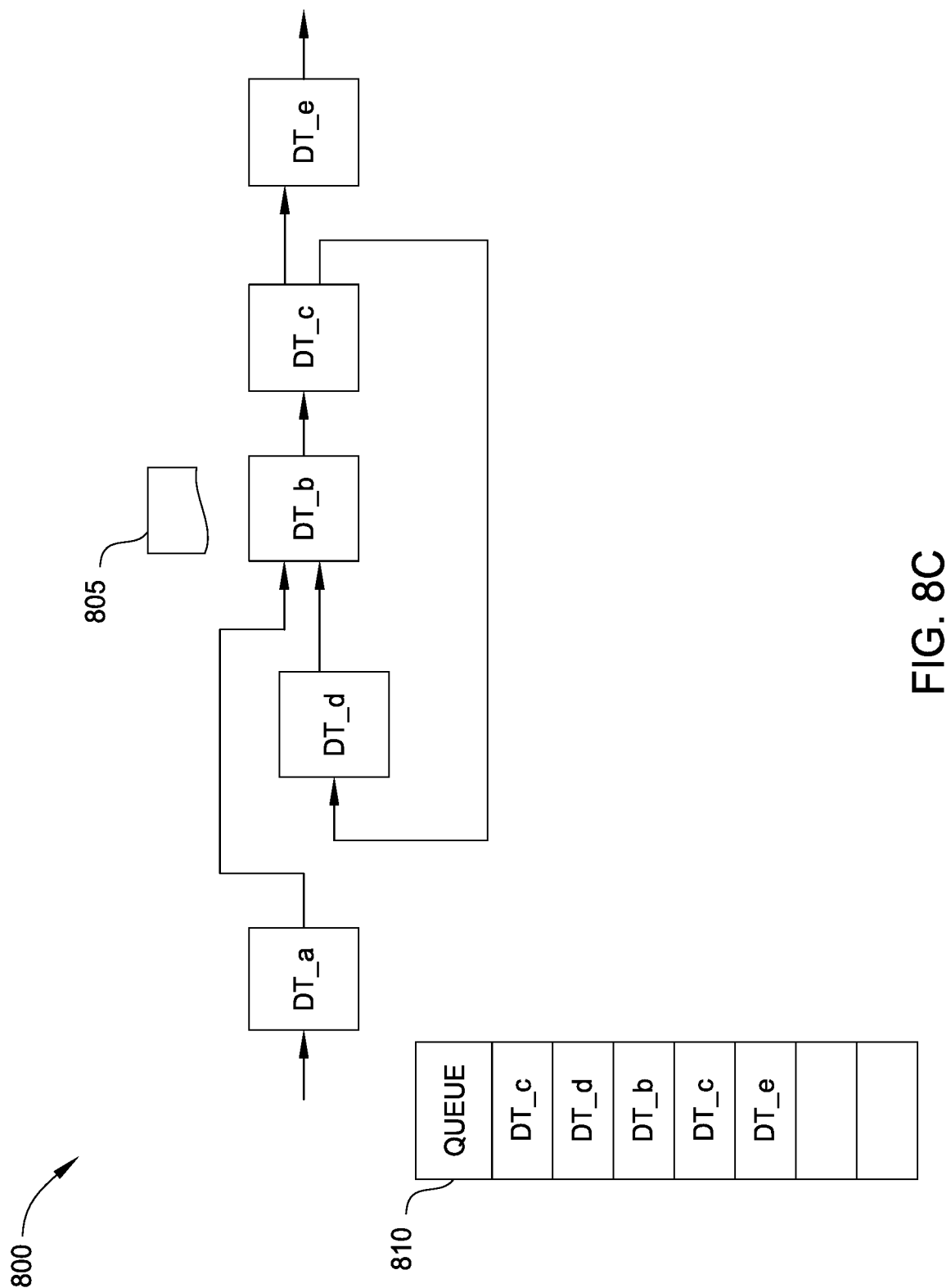
Figure 8D:
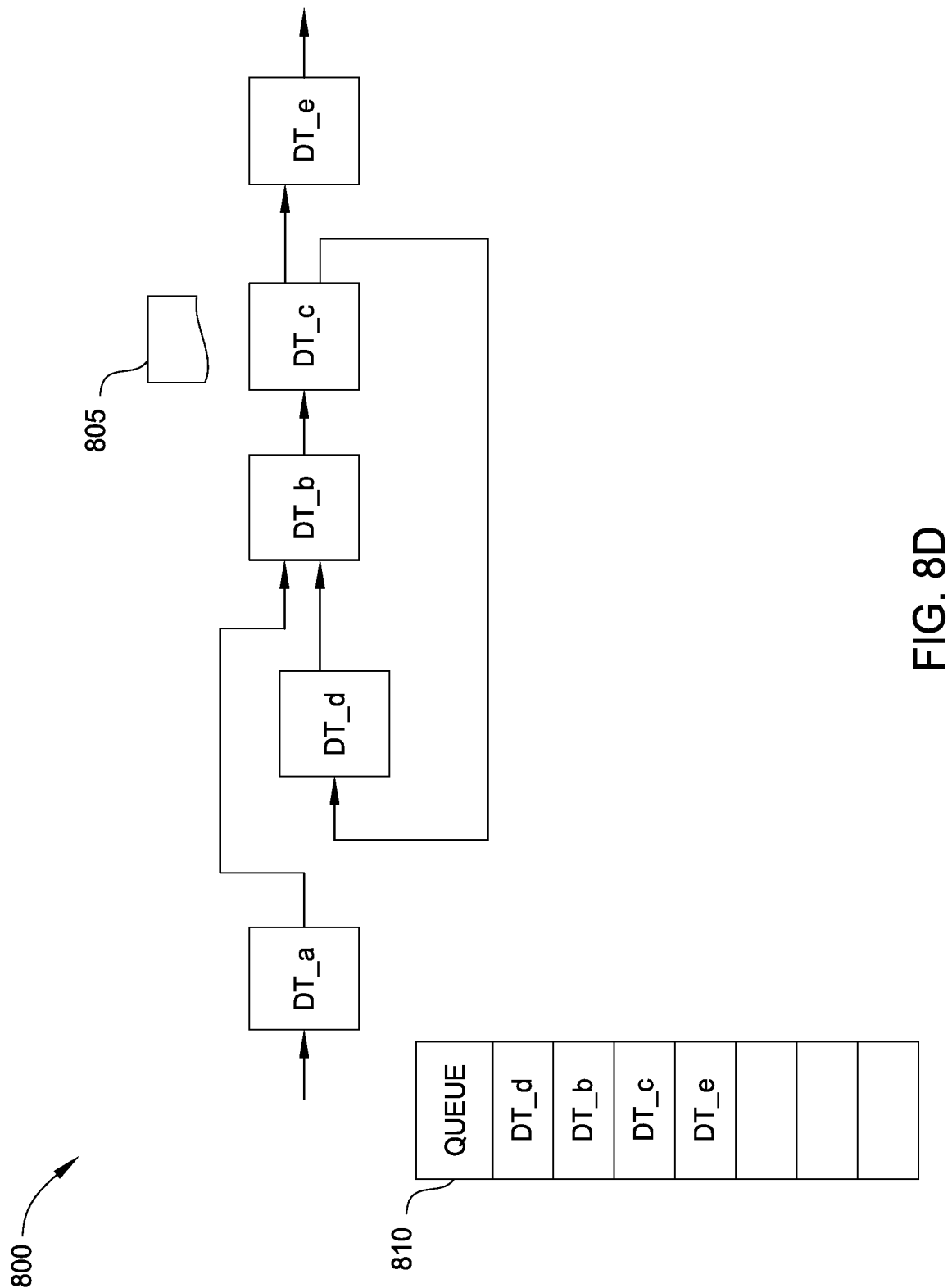

As illustrated in FIG. 8B the DPM 125 de-queued the first entry in the Queue 810, which identified DT_a as the next DT. The DPM 125 then transmitted the Data 805 to DT_a. DT_a may then process the Data 805 as defined in the configuration associated with the DT_a. Next, DT_a (or a framework or module therein) may pop the top element from the Queue 810 to determine that the Data 805 should be transmitted to DT_b. In FIG. 8C, the Data 805 has been transmitted to DT_b for processing. After these operations are completed, the DT_b de-queues the next element, and determines that the Data 805 is to be forwarded to DT_c. In FIG. 8D, the Data 805 has been transmitted to DT_c for processing or transformation. After this processing is complete, the DT_c may utilize the Queue 810 stored in the metadata of Data 805 to determine that the next DT in the pipeline is DT_d. Thus, although DT_c has two pipes exiting it, it can select the appropriate logical connection based on the Queue 810.

Figure 8E:
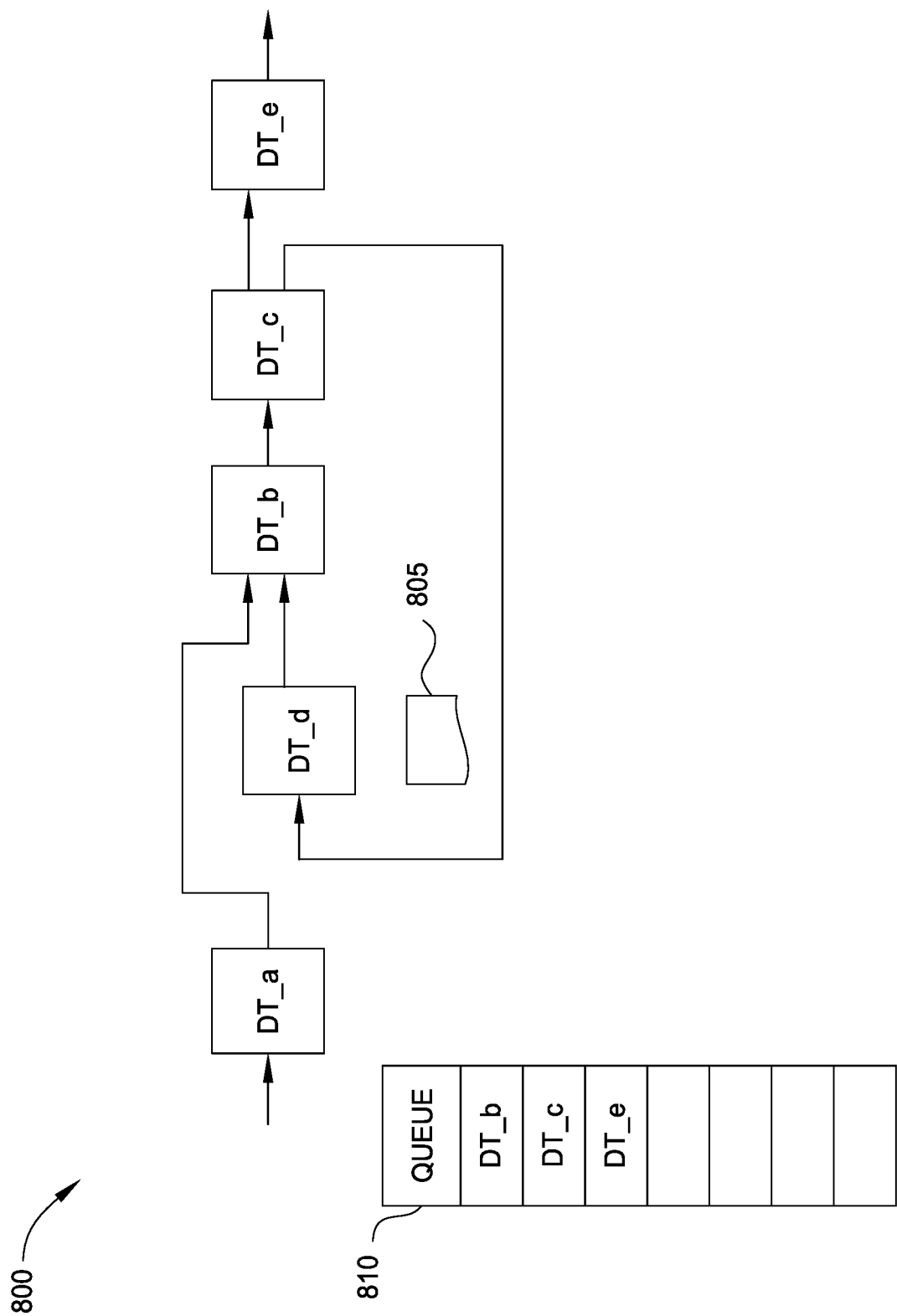
Figure 8F:
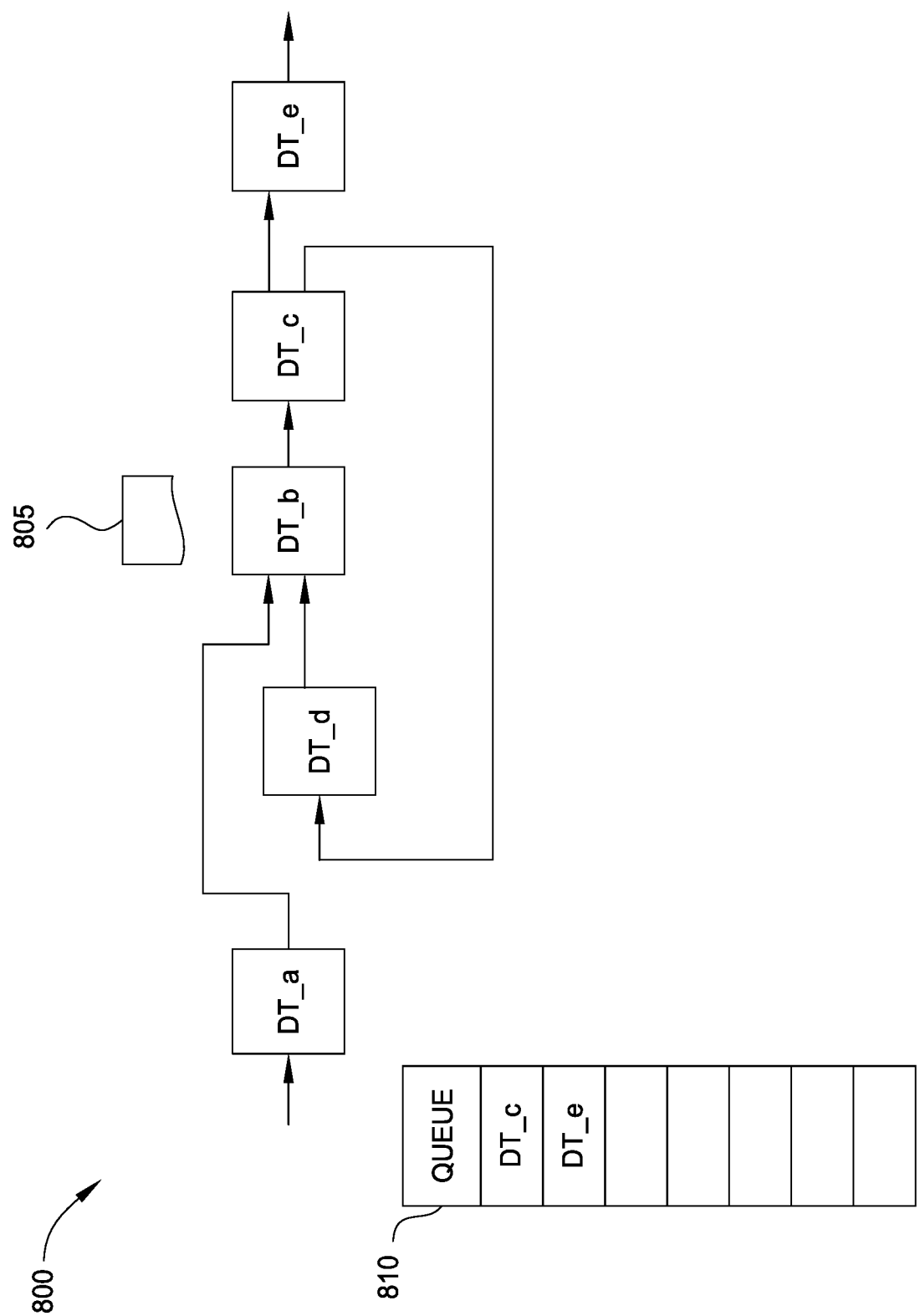
Figure 8G:
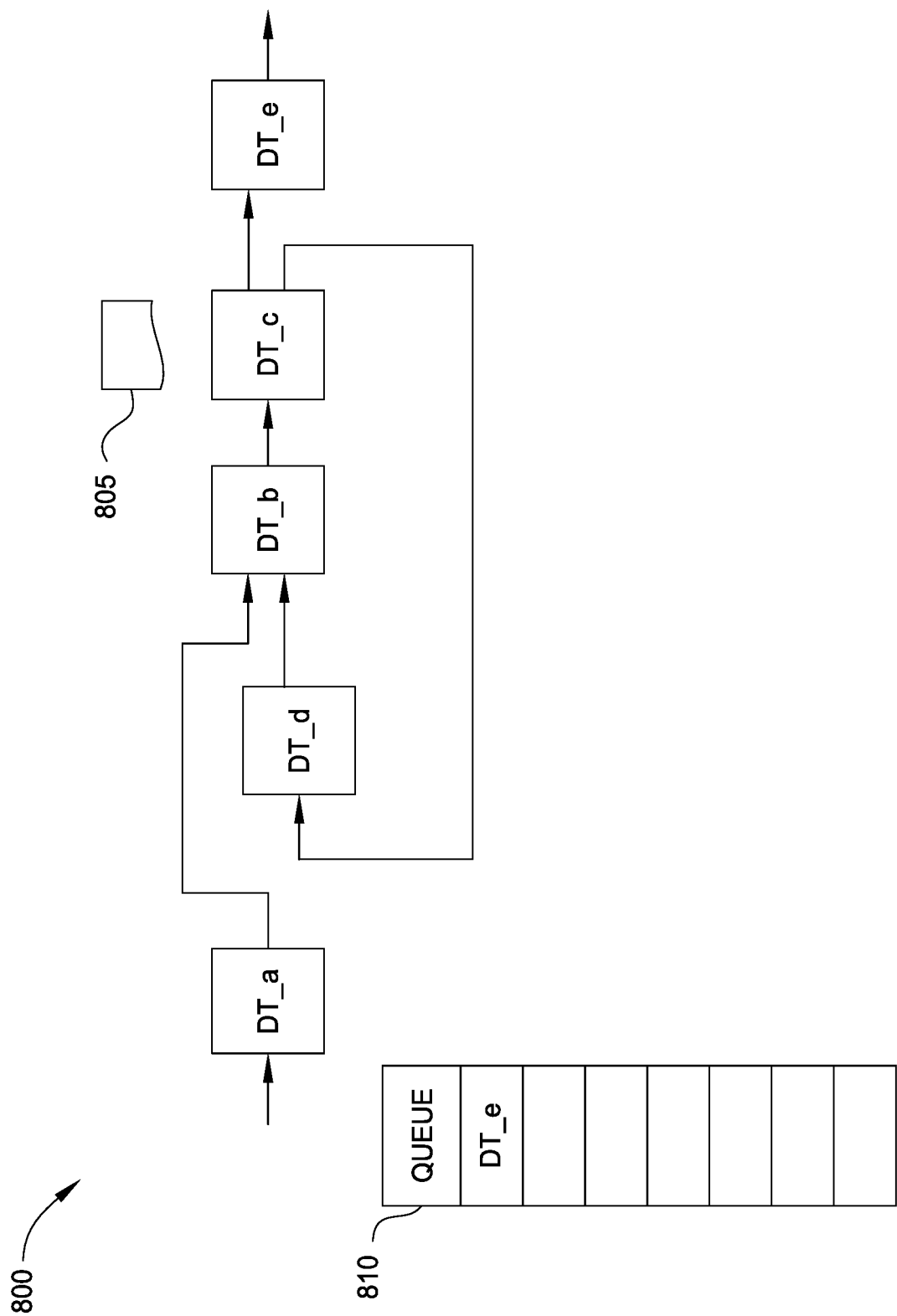
Figure 8H:
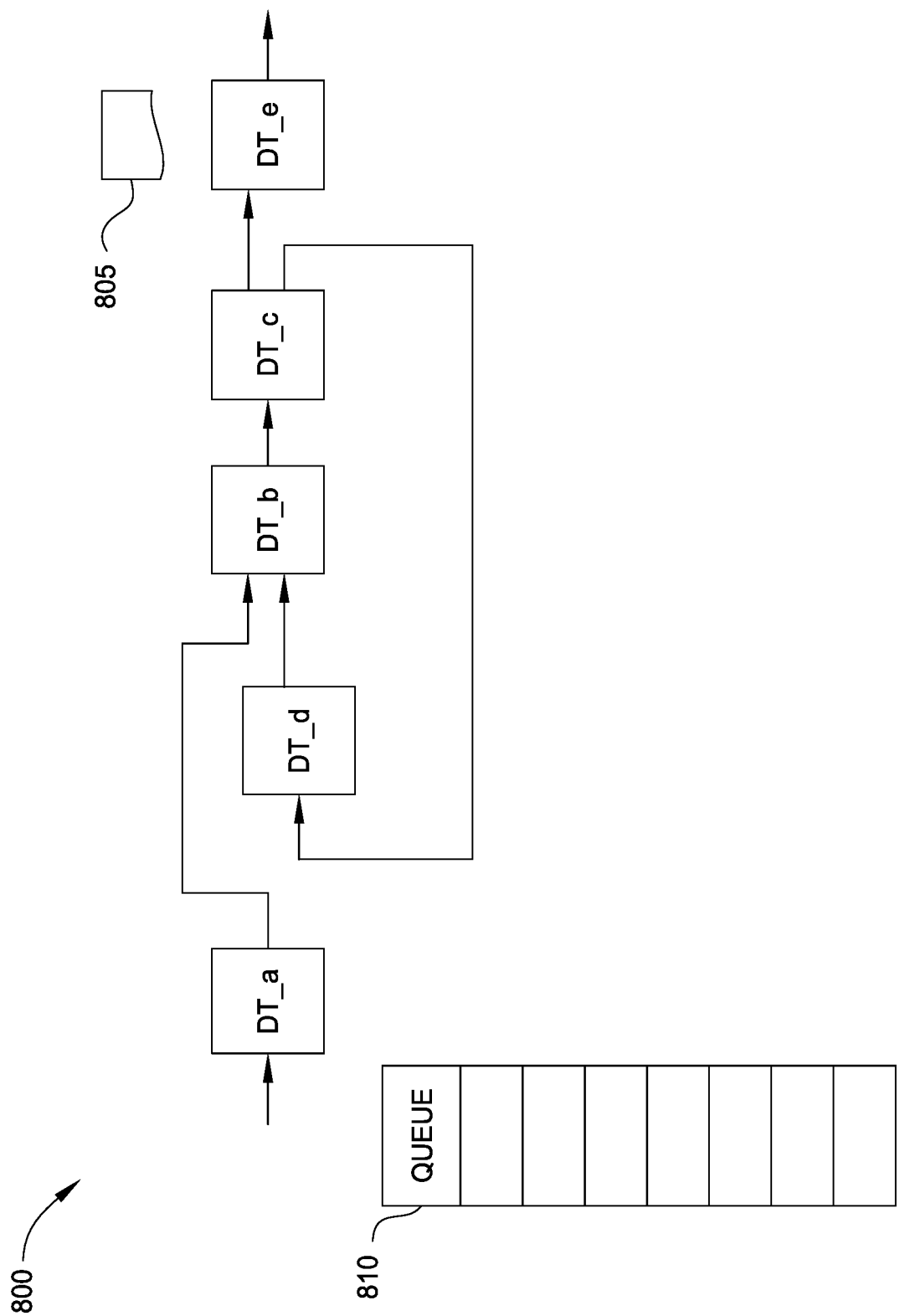
Figure 8I:
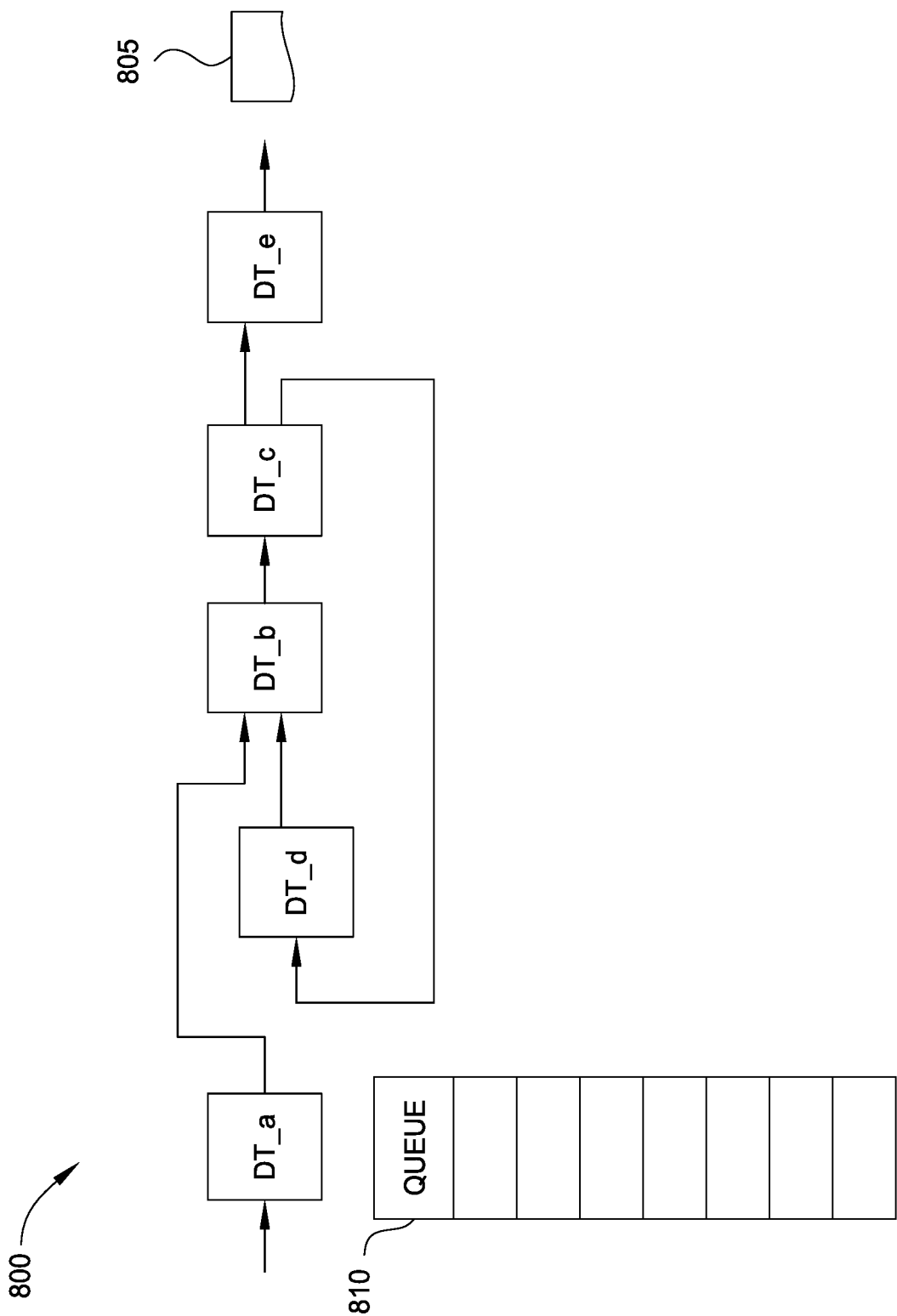

In FIG. 8E, the Data 805 has been received by DT_d to be processed. After this processing is complete, DT_d similarly inspects the Queue 810 to determine that the next DT is DT_b. The data can then be transmitted to DT_b via the appropriate pipe or logical connection. In FIG. 8F, the Data 805 is again received by DT_b for processing. As discussed above, this processing may be the same processing that was already performed on the Data 805 in FIG. 8C, although the Data 805 may have been transformed or changed by the intervening processing or operations performed by DT_c and DT_d. After processing the Data 805, DT_b uses the Queue 810 to identify DT_c as the next DT in the pipeline, and transmits the data to DT_c. In FIG. 8G, the Data 805 has been received by DT_c for processing. Again, in an embodiment this processing is identical to the processing that DT_c already completed on the Data 805 in FIG. 8D, although the Data 805 may have been transformed or changed by the intervening processing of DT_d and DT_b. After these operations are complete, the DT_c identifies DT_e as the next DT based on the Queue 810. In this way, the Data 805 is routed based on the Pipeline Definition 405, and is not transmitted to any extra DT, nor does it skip or miss any required DT. In FIG. 8H, DT_e has received the Data 805 for processing. After completing these operations, DT_e determines that it is the last DT, because no DT remain in the Queue 810. Thus, as illustrated in FIG. 8I, DT_e transmits the Data 805 out of the Pipeline 800 (e.g., to the client, to a Data Reservoir 110, and the like).

Figure 9:
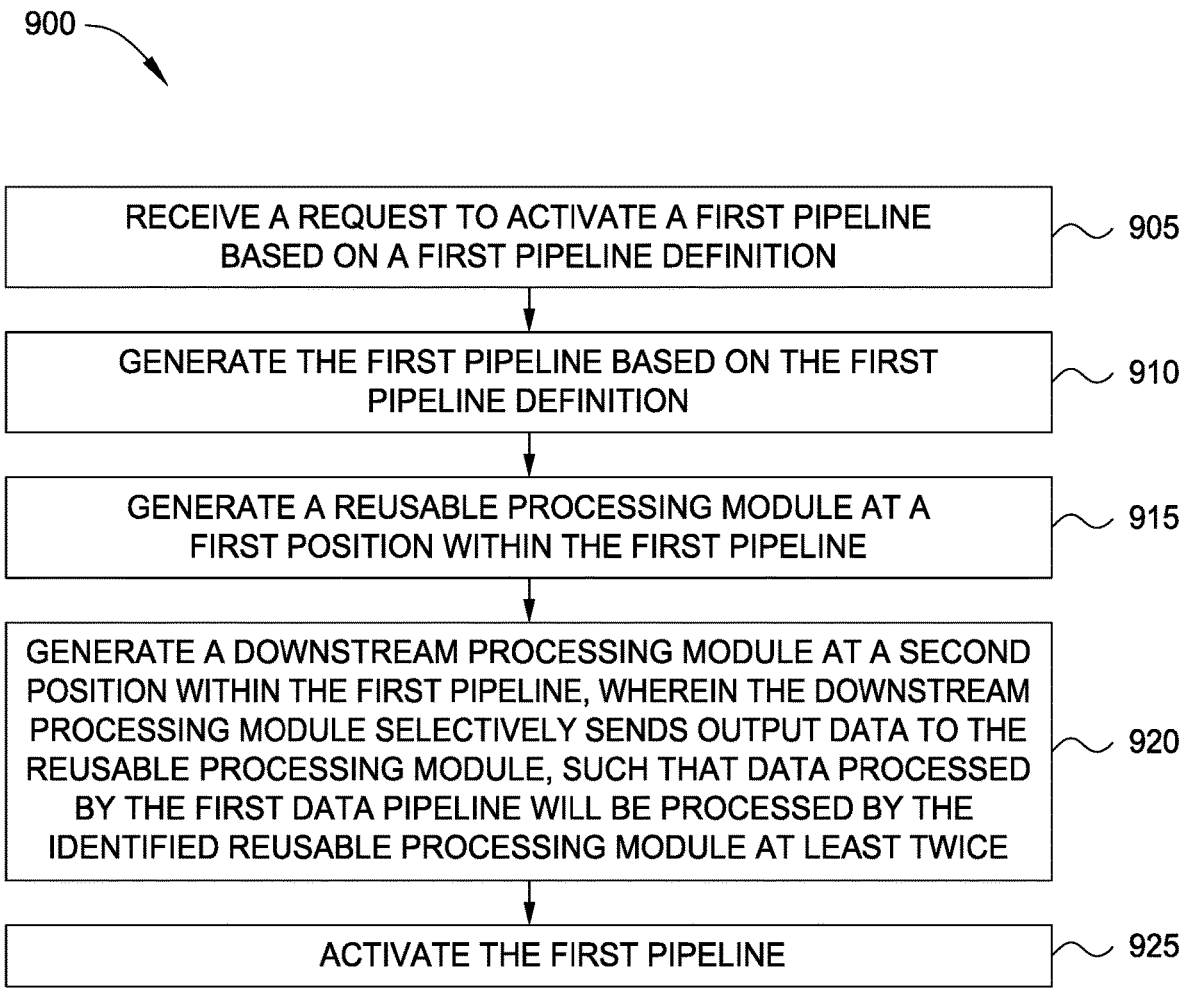
FIG. 9 is a flow diagram illustrating a method for generating data pipelines, according to one embodiment disclosed herein.

FIG. 9 is a flow diagram illustrating a method 900 for generating data pipelines, according to one embodiment disclosed herein. The method 900 begins at block 905, where the Pipeline System 100 receives a request to activate a first pipeline based on a first pipeline definition. The method 900 then proceeds to block 910, where the Pipeline System 100 generates the first pipeline based on the first pipeline definition. As illustrated in block 915, generating the first pipeline comprises generating a reusable processing module at a first position within the first pipeline. Additionally, as illustrated by block 920, generating the first pipeline further comprises generating a downstream processing module at a second position within the first pipeline, wherein the downstream processing module selectively sends output data to the reusable processing module, such that data processed by the first data pipeline will be processed by the identified reusable processing module at least twice. Finally, at block 925, the Pipeline System activates the first pipeline. The activated pipeline is then ready for use in processing data.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., on a Pipeline System 100) or related data available in the cloud. For example, the Pipeline System 100 could execute on a computing system in the cloud and process client data on one or more cloud servers. In such a case, the Pipeline System 100 could instantiate and control data pipelines and store data transformers and processed data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving a request to activate a first pipeline based on a first pipeline definition;
generating the first pipeline based on the first pipeline definition, wherein generating the first pipeline comprises:
generating a reusable processing module at a first position within the first pipeline;
subsequent to generating the reusable processing module and prior to generating an upstream processing module, generating a downstream processing module at a second position within the first pipeline, wherein the downstream processing module receives data from the reusable processing module and selectively sends output data back to the reusable processing module, such that data processed by the first data pipeline will be processed by the reusable processing module at least twice; and
subsequent to generating both the reusable processing module and the downstream processing module, generating the upstream processing module at a third position within the first pipeline, wherein the upstream processing module sends output data to the reusable processing module; and
subsequent to generating the upstream and downstream processing modules, activating the first pipeline by activating the upstream, downstream, and reusable processing modules.

2. The method of claim 1, the method further comprising determining that the reusable processing module is activated in an existing pipeline, wherein generating the reusable processing module in the first pipeline comprises connecting at least one processing module in the first pipeline to the activated reusable processing module in the existing pipeline.

3. The method of claim 1, further comprising:
identifying the reusable processing module in the first pipeline definition, based at least in part on an expected workload for the reusable processing module.

4. The method of claim 1, further comprising:
identifying the reusable processing module in the first pipeline definition, based at least in part on an entity that requested the activation of the first pipeline.

5. The method of claim 1, wherein the first pipeline definition comprises a list of processing modules to be used to generate the first pipeline and a list of connections for the processing modules in the list of processing modules.

6. The method of claim 5, further comprising:
identifying the reusable processing module based at least in part on determining that the list of processing modules includes the reusable processing module at least twice.

7. The method of claim 5, the method further comprising:
receiving a first piece of data to be processed by the first pipeline;
generating a queue based on the first pipeline definition, wherein the queue comprises an indication of each of the processing modules in the list of processing modules, arranged in order based on the first pipeline definition;
associating the queue with the first piece of data, such that the queue is linked to the first piece of data and is not associated with any of the processing modules in the list of processing modules;
de-queueing an element at a top of the queue, wherein the element at the top of the queue is an indication of a first processing module;
based on the de-queued indication of the first processing module, determining to transmit the first piece of data to the first processing module; and
transmitting the first piece of data to the first processing module.

8. The method of claim 7, the method further comprising:
receiving, at the first processing module, the first piece of data and the queue;
processing, by the first processing module, the first piece of data;
de-queueing, by the first processing module, the element at a top of the queue, wherein the element at the top of the queue is an indication of a next processing module;
based on the de-queued indication of the next processing module, determining to transmit the first piece of data to the next processing module; and
transmitting the first piece of data to the next processing module.

9. The method of claim 1, the method further comprising:
updating a list of processing modules to include the reusable processing module;
receiving a request to activate a second pipeline based on a second pipeline definition;
determining that the reusable processing module is included in the second pipeline definition; and
generating the second pipeline based on the second pipeline definition, wherein the at least one processing module in the second pipeline is connected to the reusable processing module.

10. A computer program product comprising a computer-readable storage medium having computer-readable program code embodied therewith, the computer-readable program code executable by one or more computer processors to perform an operation comprising:
receiving a request to activate a first pipeline based on a first pipeline definition;
generating the first pipeline based on the first pipeline definition, wherein generating the first pipeline comprises:
generating a reusable processing module at a first position within the first pipeline;
subsequent to generating the reusable processing module and prior to generating an upstream processing module, generating a downstream processing module at a second position within the first pipeline, wherein the downstream processing module receives data from the reusable processing module and selectively sends output data back to the reusable processing module, such that data processed by the first data pipeline will be processed by the reusable processing module at least twice; and
subsequent to generating both the reusable processing module and the downstream processing module, generating the upstream processing module at a third position within the first pipeline, wherein the upstream processing module sends output data to the reusable processing module; and
subsequent to generating the upstream and downstream processing modules, activating the first pipeline by activating the upstream, downstream, and reusable processing modules.

11. The computer program product of claim 10, wherein the first pipeline definition comprises a list of processing modules to be used to generate the first pipeline and a list of connections for the processing modules in the list of processing modules.

12. The computer program product of claim 11, further comprising:
identifying the reusable processing module based at least in part on determining that the list of processing modules includes the reusable processing module at least twice.

13. The computer program product of claim 11, the operation further comprising:
receiving a first piece of data to be processed by the first pipeline;
generating a queue based on the first pipeline definition, wherein the queue comprises an indication of each of the processing modules in the list of processing modules, arranged in order based on the first pipeline definition;
associating the queue with the first piece of data, such that the queue is linked to the first piece of data and is not associated with any of the processing modules in the list of processing modules;
de-queueing an element at a top of the queue, wherein the element at the top of the queue is an indication of a first processing module;
based on the de-queued indication of the first processing module, determining to transmit the first piece of data to the first processing module; and
transmitting the first piece of data to the first processing module.

14. The computer program product of claim 13, the operation further comprising:
receiving, at the first processing module, the first piece of data and the queue;
processing, by the first processing module, the first piece of data;

de-queueing, by the first processing module, the element at a top of the queue, wherein the element at the top of the queue is an indication of a next processing module;

based on the de-queued indication of the next processing module, determining to transmit the first piece of data to the next processing module; and transmitting the first piece of data to the next processing module.

15. The computer program product of claim 10, the operation further comprising:

updating a list of processing modules to include the reusable processing module;

receiving a request to activate a second pipeline based on a second pipeline definition;

determining that the reusable processing module is included in the second pipeline definition; and generating the second pipeline based on the second pipeline definition, wherein the at least one processing module in the second pipeline is connected to the reusable processing module.

16. A system comprising: one or more computer processors; and a memory containing a program which when executed by the one or more computer processors performs an operation, the operation comprising:

receiving a request to activate a first pipeline based on a first pipeline definition;

generating the first pipeline based on the first pipeline definition, wherein generating the first pipeline comprises:

generating a reusable processing module at a first position within the first pipeline;

subsequent to generating the reusable processing module and prior to generating an upstream processing module, generating a downstream processing module at a second position within the first pipeline, wherein the downstream processing module receives data from the reusable processing module and selectively sends output data back to the reusable processing module, such that data processed by the first data pipeline will be processed by the reusable processing module at least twice; and subsequent to generating both the reusable processing module and the downstream processing module, generating the upstream processing module at a third position within the first pipeline, wherein the upstream processing module sends output data to the reusable processing module; and subsequent to generating the upstream and downstream processing modules, activating the first pipeline by activating the upstream, downstream, and reusable processing modules.

17. The system of claim 16, wherein the first pipeline definition comprises a list of processing modules to be used to generate the first pipeline and a list of connections for the processing modules in the list of processing modules.

18. The system of claim 17, further comprising:

identifying the reusable processing module based at least in part on determining that the list of processing modules includes the reusable processing module at least twice.

19. The system of claim 17, the operation further comprising:

receiving a first piece of data to be processed by the first pipeline;

generating a queue based on the first pipeline definition, wherein the queue comprises an indication of each of the processing modules in the list of processing modules, arranged in order based on the first pipeline definition;

associating the queue with the first piece of data, such that the queue is linked to the first piece of data and is not associated with any of the processing modules in the list of processing modules;

de-queueing an element at a top of the queue, wherein the element at the top of the queue is an indication of a first processing module;

based on the de-queued indication of the first processing module, determining to transmit the first piece of data to the first processing module; and transmitting the first piece of data to the first processing module.

20. The system of claim 19, the operation further comprising:

receiving, at the first processing module, the first piece of data and the queue;

processing, by the first processing module, the first piece of data;

de-queueing, by the first processing module, the element at a top of the queue, wherein the element at the top of the queue is an indication of a next processing module;

based on the de-queued indication of the next processing module, determining to transmit the first piece of data to the next processing module; and transmitting the first piece of data to the next processing module.

* * * * *